United States Patent [19]
Oliver et al.

[11] Patent Number: 5,703,569
[45] Date of Patent: Dec. 30, 1997

[54] RETROFIT HYDRAULIC FLUID LEAK DETECTION SYSTEM

[75] Inventors: Joseph J. Oliver, Lincoln, Nebr.; Christopher L. Young, Fargo, N. Dak.; Richard D. Bednar, Lake Mills, Wis.

[73] Assignee: Ransomes America Corporation, Lincoln, Nebr.

[21] Appl. No.: 481,910

[22] Filed: Jun. 7, 1995

Related U.S. Application Data

[63] Continuation-in-part of Ser. No. 328,929, Oct. 25, 1994, Pat. No. 5,548,278, which is a continuation-in-part of Ser. No. 191,518, Feb. 3, 1984, Pat. No. 5,402,110.

[51] Int. Cl.⁶ ............................................. G08B 21/00
[52] U.S. Cl. .................. 340/605; 73/295; 73/290 R
[58] Field of Search ................ 340/605; 73/295, 73/290 B, 290 R, 292, 49.25; 364/551.01, 509

[56] References Cited

U.S. PATENT DOCUMENTS

| | | | |
|---|---|---|---|
| 3,438,247 | 4/1969 | Lotti et al. | 73/40 |
| 3,568,705 | 3/1971 | Boyadjieff et al. | 137/87 |
| 3,576,959 | 5/1971 | Bogosoff | 340/450.1 |
| 3,667,605 | 6/1972 | Zielinski | 210/170 |
| 3,685,531 | 8/1972 | Byford | 91/421 |
| 3,708,245 | 1/1973 | King | 417/13 |
| 4,020,481 | 4/1977 | Nakagawa | 340/624 |
| 4,057,700 | 11/1977 | Nakashima | 200/840 |
| 4,090,396 | 5/1978 | O'Brien | 340/624 |
| 4,152,925 | 5/1979 | Lindh | 73/40.5 R |
| 4,274,328 | 6/1981 | Pedersen | 91/445 |
| 4,522,109 | 6/1985 | Marchi et al. | 91/420 |
| 4,522,167 | 6/1985 | Humer | 184/103.1 |
| 4,549,429 | 10/1985 | Kurt | 73/40 |
| 4,563,674 | 1/1986 | Kobayashi | 340/620 |
| 4,571,987 | 2/1986 | Horner | 73/292 |
| 4,590,462 | 5/1986 | Moorehead | 340/605 |
| 4,591,837 | 5/1986 | Martinez | 340/605 |
| 4,611,620 | 9/1986 | Wang | 137/100 |
| 4,732,035 | 3/1988 | Lagergren et al. | 73/49.25 |
| 4,750,775 | 6/1988 | Miller | 296/38 |
| 4,781,057 | 11/1988 | Hyfantis, Jr. et al. | 73/49.2 T |
| 4,811,601 | 3/1989 | Tolan | 73/49.2 T |

(List continued on next page.)

*Primary Examiner*—Jeffery Hofsass
*Assistant Examiner*—Julie B. Lieu
*Attorney, Agent, or Firm*—Harness, Dickey & Pierce, P.L.C.

[57] ABSTRACT

Provided is a self-calibrating system which self-calibrates for operation regardless of the particular reservoir or expansion tank, which further detects when a hydraulic fluid system adapted to a turf care machine has developed a leak and which warns the machine operator of such a leak before an appreciable amount of hydraulic fluid is allowed to leak from the system. The system includes a reservoir for holding a quantity of hydraulic fluid. The reservoir is connected via a connecting tube or hose located at the upper-most portion of the reservoir and connected to an expansion tank mounted substantially adjacent to the reservoir. The expansion tank includes a fitting having an elongated tube extending down into the expansion tank. The end of this tube is maintained substantially below the level of hydraulic fluid in the expansion tank during operation of the turf care machine to which it is attached. As the machine is operated, the hydraulic fluid expands with rising temperatures, and the connecting tube communicates the expanding fluid to the expansion tank. When operation of the machine is discontinued the hydraulic fluid contracts as it cools. As the hydraulic fluid contracts, the hydraulic fluid in the expansion tank is automatically drawn by a siphoning action through the elongated tube within the expansion tank through the connecting tube and back into the reservoir. The self-calibrating leak detection system is adaptable to a variety of self propelled machines having hydraulically actuated devices. In particular, significant savings could be gained by the early detection of hydraulic system leaks on large, earth-moving equipment and the like. Further, the self-calibrating hydraulic fluid leak detection system may be retrofit onto existing hydraulic systems by the addition of an expansion tank to the hydraulic system reservoir.

86 Claims, 13 Drawing Sheets

U.S. PATENT DOCUMENTS

| | | | |
|---|---|---|---|
| 4,827,762 | 5/1989 | Hasselmann | 73/49.2 T |
| 4,852,054 | 7/1989 | Mastandrea | 340/605 |
| 4,961,064 | 10/1990 | Hara | 338/231 |
| 4,987,769 | 1/1991 | Peacock et al. | 73/49.7 |
| 5,021,665 | 6/1991 | Ames | 250/351 |
| 5,156,042 | 10/1992 | Carlin et al. | 73/49.2 T |
| 5,187,973 | 2/1993 | Kunze et al. | 364/509 |
| 5,315,529 | 5/1994 | Farmer | 364/509 |
| 5,402,110 | 3/1995 | Oliver et al. | 340/605 |
| 5,445,010 | 8/1995 | Peacock | 340/605 |
| 5,548,278 | 8/1996 | Oliver et al. | 340/605 |

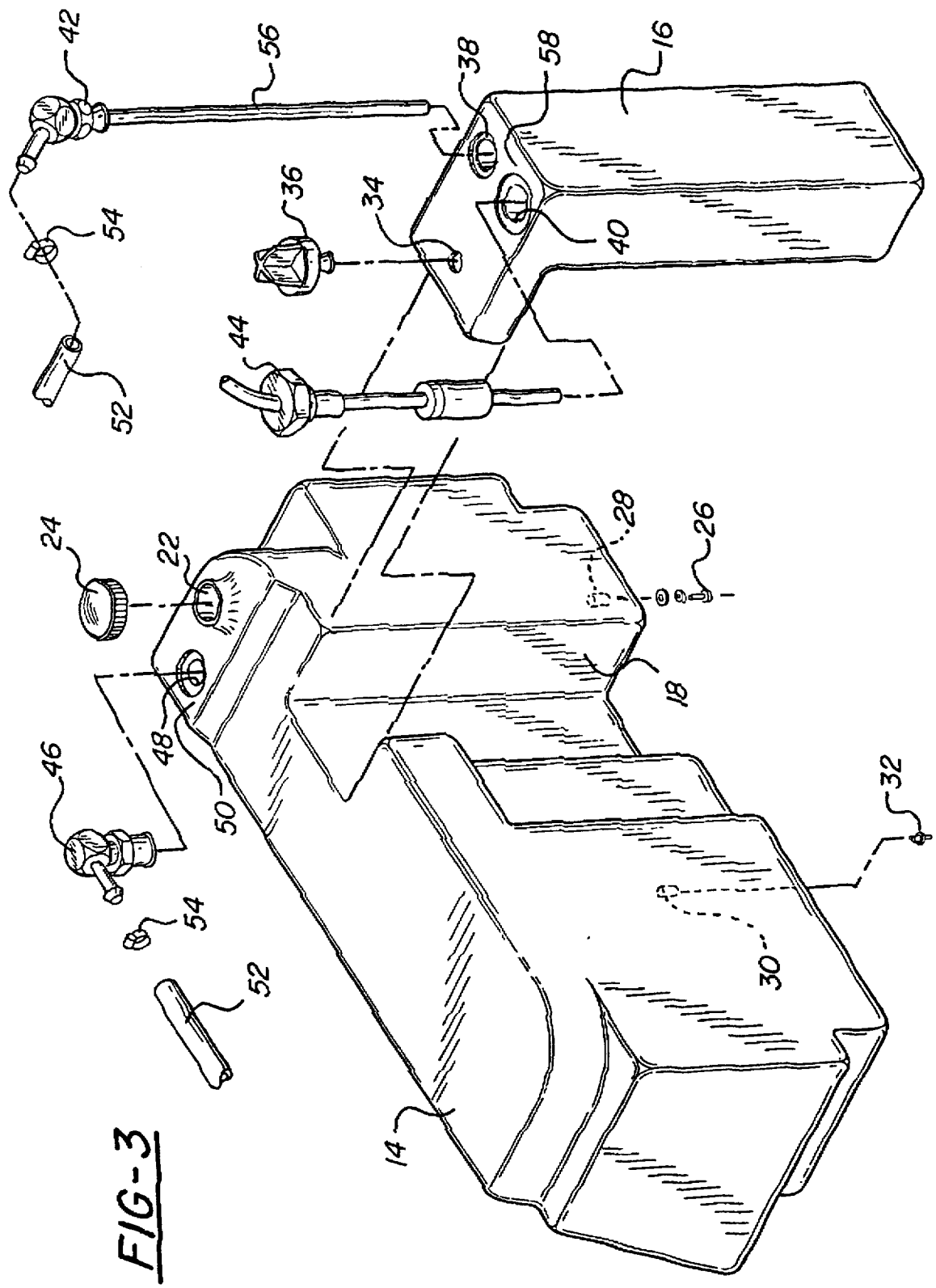

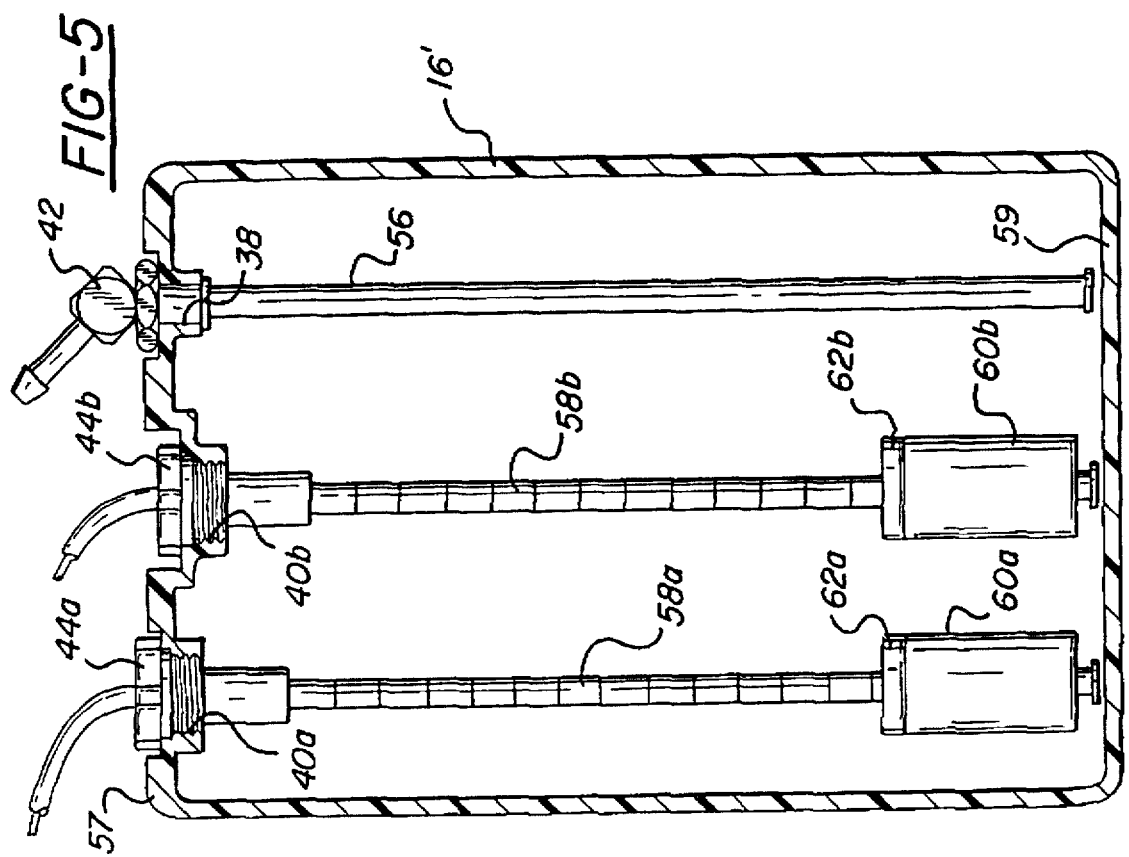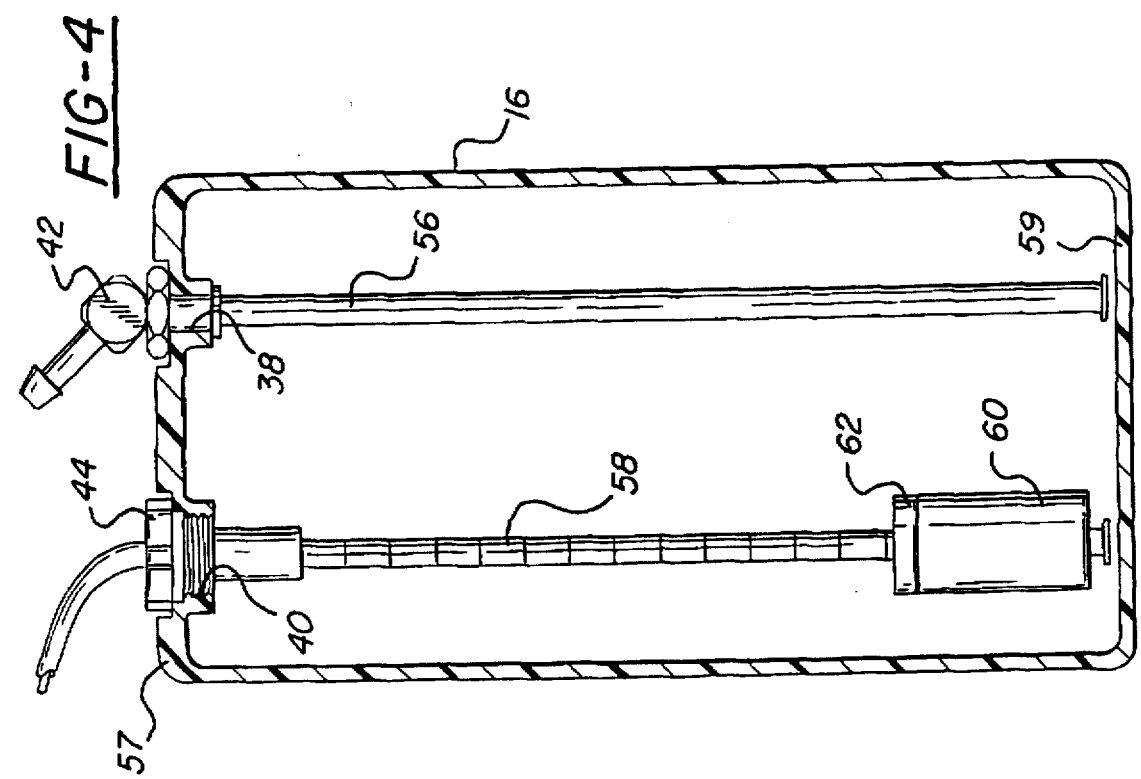

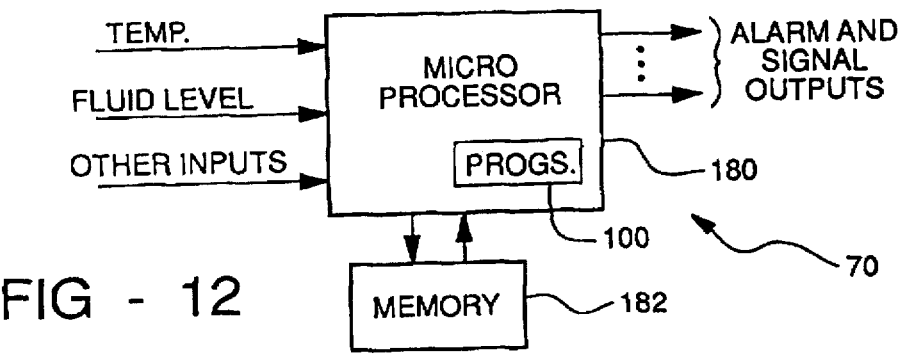
FIG - 12
| OIL LEVEL | TEMPERATURE |
|---|---|
| * | * |
| * | * |
| * | * |
| 40 COUNTS | 50°F |
| 47 COUNTS | 56°F |
| 51 COUNTS | 62°F |
| 55 COUNTS | 70°F |
| 61 COUNTS | 73°F |
| 65 COUNTS | 77°F |
| * | * |
| * | * |
| * | * |
| 115 COUNTS | 100°F |
| 121 COUNTS | 106°F |
| 125 COUNTS | 110°F |
| 129 COUNTS | 115°F |
| 135 COUNTS | 120°F |
| 140 COUNTS | 126°F |
| * | * |
| * | * |
| * | * |
FIG - 13
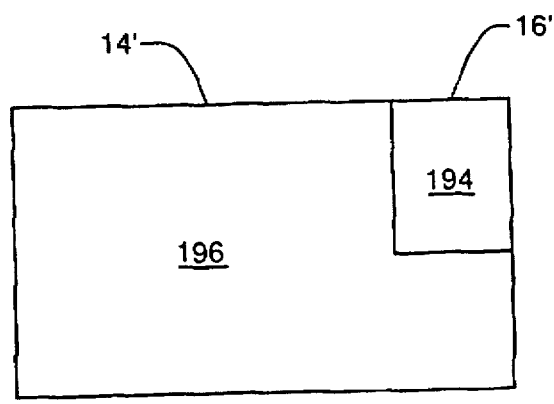
FIG - 14

RETROFIT HYDRAULIC FLUID LEAK DETECTION SYSTEM

CROSS REFERENCE TO RELATED APPLICATIONS

This application is a continuation in part of U.S. patent application Ser. No. 08/328,929, filed Oct. 25, 1994, now U.S. Pat. No. 5,548,278, which is a continuation-in-part of U.S. patent application Ser. No. 08/191,518, filed Feb. 3, 1994 now U.S. Pat. No. 5,402,110, issues Mar. 28, 1995.

BACKGROUND OF THE INVENTION

1. Field of the Invention

The present invention relates generally to turf care and other hydraulically powered equipment and more particularly, to a system which self-calibrates and which detects the occurrence of leaks in a hydraulic fluid system of a turf care machine and for providing a warning to the machine operator of such condition. Further, the present invention relates to a leak detection system which is adaptable to, and may be retrofitted to existing hydraulic fluid reservoirs of varying size and shape and which alleviates the need for fixed, tank-specific calibrations.

2. Discussion

Turf care machines are powered by a variety of means such as belts and pulleys, shafts and linkages, and the like. A common method of powering a turf care machine is to provide a source of pressurized hydraulic fluid. The pressurized hydraulic fluid can be used to power hydrostatic drive motors for propelling the turf care machine or for powering various implements such as mowers, aerators and the like. One problem with such machines is the potential for developing a leak in the hydraulic system. Should the system develop a large leak, the hydraulic fluid, under pressure, is rapidly expelled from the hydraulic system and onto the turf being treated by the machine. Often, because the machine is being operated early in the morning or late in the evening, the operator does not see the fluid spewing onto the turf until a considerable amount has leaked out, and the damage to the turf has been done. In other cases, the system develops a slow leak which leaks almost imperceptible amounts of hydraulic fluid onto the turf, but amounts sufficient to cause damage. Moreover, because the slow leak is not readily detected, fluid may be lost over several greens hence causing widespread damage. Because of the time required to grow a golf course green, sometimes several years to full maturity, and the cost associated with starting and maintaining a green, generally tens of thousands of dollars, it is vitally important to be able to detect when a machine incorporating a hydrostatic drive system has developed a leak.

U.S. Pat. No. 4,591,837 to Martinez (the Martinez system), the disclosure of which is hereby incorporated by reference, discloses a system for detecting when a hydrostatic drive system of a turf care machine has developed a leak and for providing a warning signal if such a leak occurs. The system includes a tube which communicates with and extends above the hydraulic fluid reservoir. A chamber is disposed above the tube, and there is a float disposed within the tube. At the start of operation, the machine operator fills the hydraulic fluid reservoir such that the float remains near the top of the tube. The float has a contact imbedded therein, and the tube has complementary contacts positioned such that when the float is near the top of the tube a circuit is established. During operation, expanding fluid is allowed to flow past the float and into the chamber. If a leak occurs, the fluid level within the reservoir begins to drop. If it drops a sufficient amount such that float moves away from the top of the tube, the circuit is broken and a leak is indicated.

The Martinez system suffers a number of disadvantages. First, the operator must manually drain fluid from the chamber back into the reservoir each time before using the machine. In addition, the system is only capable of accommodating a modest amount of fluid expansion. A second embodiment of the Martinez system includes a drain port for slowly allowing the fluid in the chamber to drain back into the reservoir. This relieves the operator of the task of draining the fluid back into the reservoir, however, it makes the system ineffectual for detecting small leaks. Furthermore, the Martinez system is not adapted to indicate the actual amount of hydraulic fluid within the system or the temperature of the hydraulic fluid.

Further, current leak detection systems are generally reservoir specific and require that particular, physical information, detailing the particular system on which the leak detection apparatus is installed, be hard coded into the system processor. While such calibration may be acceptable if the leak detection apparatus were installed on a limited number of hydraulic systems, such system specific calibration would be unacceptable if the size and shape of expansion tanks varied in accordance with the available space for installing the expansion tank. Thus, a particular calibration would be required for each leak detection system corresponding to a hydraulic system with an expansion tank having a unique size and shape. Furthermore, if the expansion tank incurs damage which changes the size or shape of the tank, the installation calibration fails to accurately reflect the calibrated size and shape of the expansion tank. Such a change in the size and shape requires recalibration of the physical information programmed into the processor during the original installation. Thus, a self-calibrating leak detection system would significantly improve the overall accuracy and flexibility of leak detection systems.

Further yet, hydraulically controlled devices prove to be particularly useful on various self-propelled vehicles or machines. Examples of such machines include earth movers, backhoes, front loaders, and a substantial variety of other machines which make significant use of hydraulic systems. Such vehicles, while having relatively expensive hydraulic systems, do not typically include any leak detection system which provides advanced warning to the operator so that the hydraulic system could be deactivated and the required maintenance then performed before damage occurs to the hydraulic system. One possible reason why such vehicles do not include hydraulic leak detection systems is the significant cost in retrofitting a vehicle to provide adequate and accurate hydraulic fluid leak detection. Thus, it is further desirable to provide a hydraulic fluid leak detection system which may be relatively easily and inexpensively installed onto the vehicle or self-propelled machine in a cost effective manner.

SUMMARY OF THE INVENTION

The present invention provides a self-calibrating hydraulic leak detection system which includes a reservoir for holding a quantity of hydraulic fluid. The reservoir is connected via a connecting tube or hose to an expansion tank mounted substantially adjacent to the reservoir. The expansion tank includes a fitting having an elongated tube extending down into the expansion tank. The end of this tube is maintained substantially below the level of hydraulic fluid in the expansion tank during operation of the turf care machine to which it is attached. As the machine is operated, the hydraulic fluid expands with rising temperature, and the connecting tube communicates the expanding fluid to the expansion tank. When operation of the machine is discontinued the hydraulic fluid contracts as it cools. As the hydraulic fluid within the system contracts, the hydraulic fluid in the expansion tank is automatically drawn, by siphoning action, through the elongated tube from the expansion tank through the connecting tube and back into the reservoir.

The self-calibrating hydraulic leak detection system further includes at least one float type fluid level sensor mounted to measure the level of hydraulic fluid within the expansion tank. The float level sensor sends an electronic signal corresponding to the fluid level in the expansion tank to a microcomputer based monitoring unit. The monitoring unit also senses the fluid temperature in the reservoir and interprets the electronic signals, compensating for volumetric fluctuations due to the changing fluid temperature, and determines if conditions indicate a hydraulic fluid leak exists. If so, the monitoring unit produces a warning signal which is communicated to the turf machine operator.

The self-calibrating hydraulic leak detection system further includes memory for storing the level of the hydraulic fluid in the expansion tank and the temperature of the hydraulic fluid for comparing the stored level and temperature with the measured level and temperature as indicated by the electronic signals received by the monitoring unit and determines if conditions indicate a hydraulic fluid leak exists. If so, the monitoring unit produces a warning signal which is communicated to the turf machine operator.

In an additional embodiment of the present invention, the expansion tank is made integral to and mounted above the reservoir. As the hydraulic fluid is heated it expands directly into the expansion chamber where at least one float sensor measures the height of the fluid therein.

The self-calibrating hydraulic fluid leak detection system of the present invention is also operable to display to the machine operator the actual amount of hydraulic fluid within the system and is capable of indicating If the level is too low as well as too high.

The self-calibrating hydraulic fluid leak detection system of the present invention is also operable to report the temperature of the hydraulic fluid in the system and to provide a warning indication if the fluid temperature is too high.

The self-calibrating hydraulic fluid leak detection system of the present invention is further operable to determine the existence of a leak in the hydraulic fluid system based upon the changing volume of fluid within the expansion tank.

The self-calibrating hydraulic fluid leak detection system is also operable to vent air in the system through the reservoir, into the expansion tank, and then to atmosphere so that unwanted air may be purged from the system.

The self-calibrating hydraulic fluid leak detection system is also operable to detect leaks during both the operation and transport of the vehicle on which the self-calibrating hydraulic system is installed.

The self-calibrating hydraulic fluid leak detection system is also operable to compensate for the change in shape of the expansion tank by recalibrating the system, thus alleviating the need to hard code the physical system parameters into the processor.

The self-calibrating hydraulic fluid leak detection system further includes an expansion tank having a smaller horizontal area than the reservoir to effect a multiplication of the expansion fluid in the reservoir in accordance with the ratio of the horizontal area of the expansion tank to the horizontal area of the reservoir.

The self-calibrating hydraulic fluid leak detection system is also operable to include a flared section at the top of the expansion tank to provide volume to compensate for fluid overflow.

The self-calibrating hydraulic fluid leak detection system is also operable to provide leak detection on a variety of vehicles or other self-propelled machinery having hydraulically actuated devices.

The self-calibrating hydraulic fluid leak detection system is also operable to include a retrofit expansion tank which is adaptable to installation on an existing hydraulic fluid reservoir to enable hydraulic fluid leak detection on the retrofit hydraulic system.

The hydraulic fluid leak detection system is also operable to include an expansion tank having a partially translucent section to enable the operator or other maintenance personnel to inspect the level and condition of the hydraulic fluid in the system.

The hydraulic fluid leak detection system is also operable to include an expansion tank adapter which enables an expansion tank of a predetermined size to be adaptably installed onto an existing hydraulic fluid reservoir to enable hydraulic fluid leak detection within the system.

These and other objects, advantages and features of the present invention will become readily apparent from the following detailed description, subjoined claims and drawings.

BRIEF DESCRIPTION OF THE DRAWINGS

FIG. 3 is an exploded assembly perspective of the self-calibrating hydraulic oil leak detection system of the present invention;

FIG. 4 is a sectional view taken along line 4—4 of FIG. 2 illustrating the arrangement of the level sensor within the expansion tank of the hydraulic fluid leak detection system of the present invention;

FIG. 5 is a view similar to FIG. 4 illustrating an alternative embodiment of the level sensor of the self-calibrating hydraulic fluid leak detection system of the present invention;

FIG. 12 is a block diagram of the microprocessor for implementing the self-calibrating leak detection system;

FIG. 13 is an exemplary map of hydraulic fluid temperature versus hydraulic fluid level in the expansion tank;

FIG. 14 is a sectional view through the line 14—14 of the reservoir and expansion tank depicted in FIG. 11 and demonstrates an additional feature of the present invention;

DETAILED DESCRIPTION OF THE PREFERRED EMBODIMENTS

Figure 1:
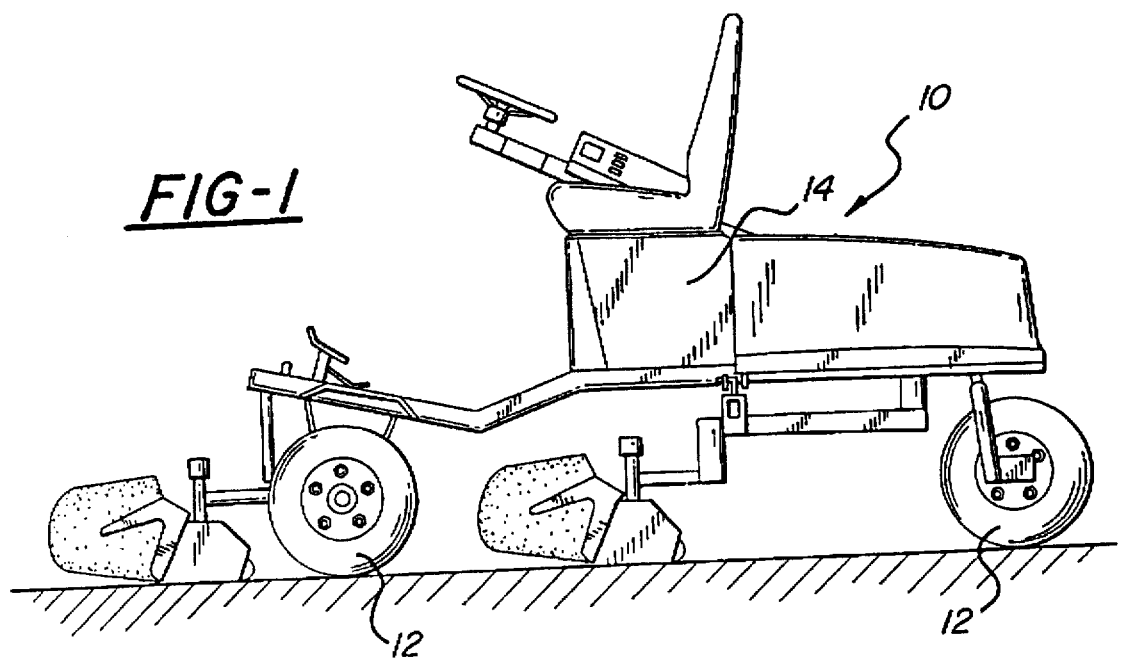
FIG. 1 is a perspective view of a typical turf machine having a pressurized hydraulic fluid system and being fitted with the self-calibrating hydraulic oil leak detection system of the present invention.

With reference to the drawings, and particularly FIG. 1, a typical turf machine 10 which is adapted as a riding type greens mower is shown. Turf machine 10 includes a plurality of ground engaging wheels 12 which are adapted to be driven by hydrostatic motors from a source of pressurized hydraulic fluid. Such a system is disclosed and described in U.S. Pat. No. 5,199,525 assigned to Ransomes, Inc. the disclosure of which is hereby expressly incorporated by reference. The hydraulic fluid system includes a reservoir 14 for providing a supply of hydraulic fluid to a pressurizing pump typically driven by an internal combustion engine, and control valuing for distributing the pressurized fluid via a plurality of conduits to the hydrostatic drive motors and for returning low pressure fluid to reservoir 14. The hydraulic system further includes an expansion tank 16 (shown in FIG. 2). During operation of the machine, the fluid is heated by the work imparted upon it by the pressurizing pump and by transfer from the various elements of turf machine 10. Heating of the fluid causes its thermal expansion, and the expanding fluid is communicated from reservoir 14 to expansion tank 16.

Figure 2:
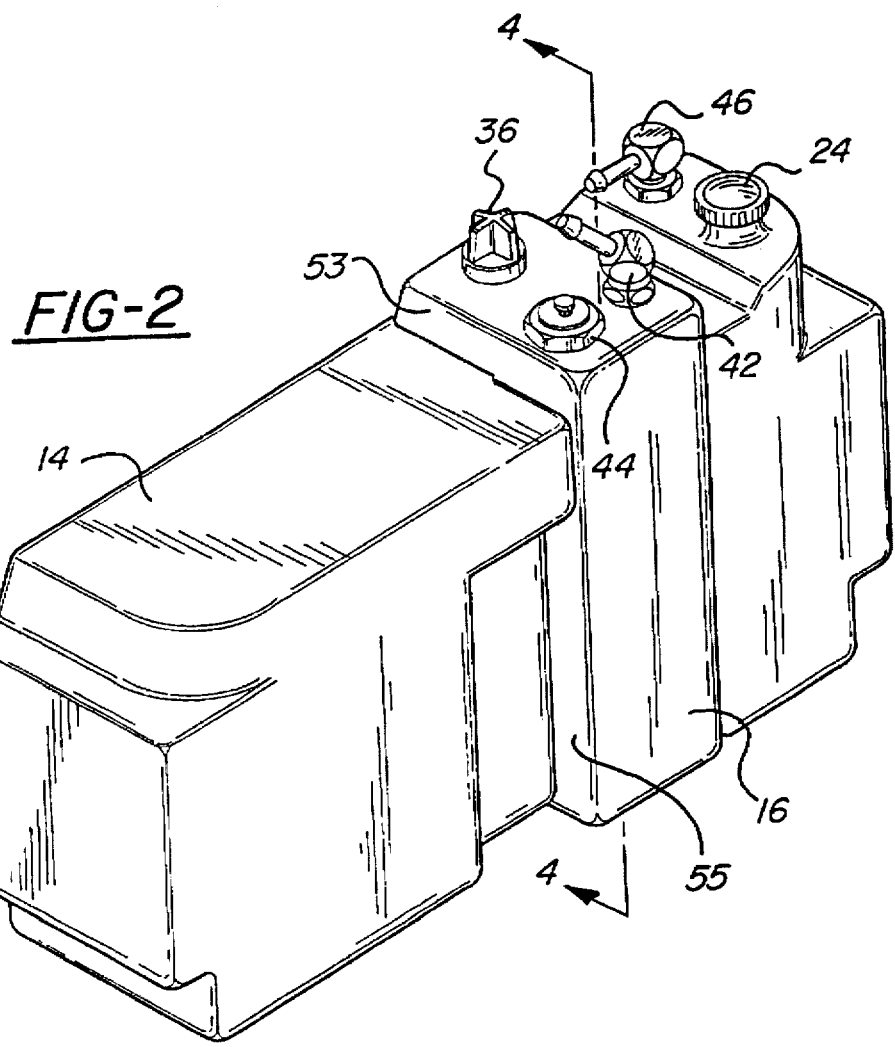
FIG. 2 is an assembly perspective of the self-calibrating hydraulic oil leak detection system of the present invention removed from the turf machine.

FIGS. 2 and 3 illustrate reservoir 14, expansion tank 16 and the associated plumbing for interconnecting the two. More particularly, reservoir 14 is formed as a hollow vessel and expansion tank 16 is a similar, but smaller, vessel secured adjacent thereto. In the preferred embodiment shown, reservoir 14 is formed with an indented portion 18 and expansion tank 16 is formed to be received into the indented portion 18 for providing a contemporary, integral appearance. However, in accordance with the self-calibrating aspect of this invention, expansion tank 16 may assume any of a number of sizes and shapes in accordance with optimizing the design shape and other parameters of reservoir 14 and the installation within turf machine 10.

Reservoir 14 is formed with a plurality of fittings (not shown) for interconnecting with the hydraulic fluid system of turf machine 10 at either the side or bottom of reservoir 14, and further includes a filling port 22 which is sealed during operation of turf machine 10 by non-vented cap 24. Reservoir 14 is secured to turf machine 10 by a plurality of fasteners, one of which is shown at 26, which engage bosses 28 formed integral to reservoir 14. Reservoir 14 is further formed with an aperture 30 at its base for receiving temperature sensor 32. Expansion tank 16 is similarly secured to turf machine 10 by fasteners adjacent to reservoir 14. Expansion tank 16 includes a port 34 fitted with a breather plug 36 and a pair of ports 38 and 40 for securing an adaptor 42 and a level sensor 44, respectively.

Reservoir 14 is fitted with an angled adaptor 46 secured to a port 48 formed in its upper surface 50, and expansion tank 16 is fitted with adaptor 42 in port 38. A flexible conduit 52 interconnects adapters 46 and 42 and is secured thereto by clamps 54. Adaptor 42 further includes expansion tube 56 which extends from the upper surface 58 of expansion tank 16 to nearly the bottom 59 thereof. As will be appreciated, as hydraulic fluid within reservoir 14 expands due to heating, the expanding fluid is communicated via conduit 52 to expansion tank 16. When operation of turf machine 10 is discontinued, the hydraulic fluid within reservoir 14 and expansion tank 16 cools and contracts. The contracting fluid is drawn by siphoning action from expansion tank 16 to reservoir 14 by expansion tube 56 and conduit 52.

FIGS. 2 and 3 may be used to demonstrate particularly advantageous features of the present invention. First, with respect to the positioning of angled adapter 46 (in reservoir 14) which communicates hydraulic fluid expanding out of reservoir 14 through conduit 52 into adapter 42 and out expansion tube 56. Angled adapter 46 is preferably positioned at the upper-most portion of reservoir 14 so that any air trapped in the hydraulic system when the reservoir was initially filled may rise to the upper-most portion of reservoir 14 and escape through angled adapter 46. The air which escapes through angled adapter 46 is syphoned through conduit 52 and expansion tube 56 where it escapes into expansion chamber 16 and is vented through breather plug 36. In order for angled adapter 46 to be located at the upper-most portion of fluid reservoir 14, upper surface 50 must correspondingly be the upper most surface of reservoir 14. A second advantageous feature depicted in FIGS. 2–3 is an overflow portion 53 of expansion tank 16. As can be seen in FIGS. 2 and 3, overflow volume 53 horizontally projects away from the elongated portion 55 of expansion tank 16 and sits atop reservoir 14. The overflow volume 53 accommodates excess fluid when hydraulic fluid expands to the top of expansion tank 16. This provides additional hydraulic fluid volume in situations where the expansion tank may be initially overfilled or the hydraulic fluid temperature rises and causes expansion of the hydraulic fluid sufficient for causing fluid to flow into overflow volume 53.

FIG. 4 illustrates level sensor 44 secured in expansion tank port 40 and extending downwardly into expansion tank 16. In the preferred embodiment, level sensor 44 is an eleven inch long float type sensor. More particularly, level sensor 44 includes a shaft 58 within which are disposed a plurality of reed switches (not shown) and resistors (not shown) which are connected in series. The reed switches act as shunts for selectively connecting a plurality of the resistors in series. The reed switches are magnetically actuated, and level sensor includes a float 60 and a magnet 62 which are slidably disposed about shaft 58. As the fluid level within expansion tank 16 rises and falls, float 60 moves upwardly and downwardly along shaft 58. Magnet 62, secured to float 60 is also caused to move upwardly and downwardly along shaft 58 causing various switches to be closed. By sensing the resistance of level sensor 44 the position of float 60 and magnet 62 may be determined, and hence, the level of fluid within expansion tank 16 may be determined. A suitable level sensor 44 is model no. 1-90-116456 manufactured by Phoenix International Corporation of Fargo, N. Dak.

Figure 6:
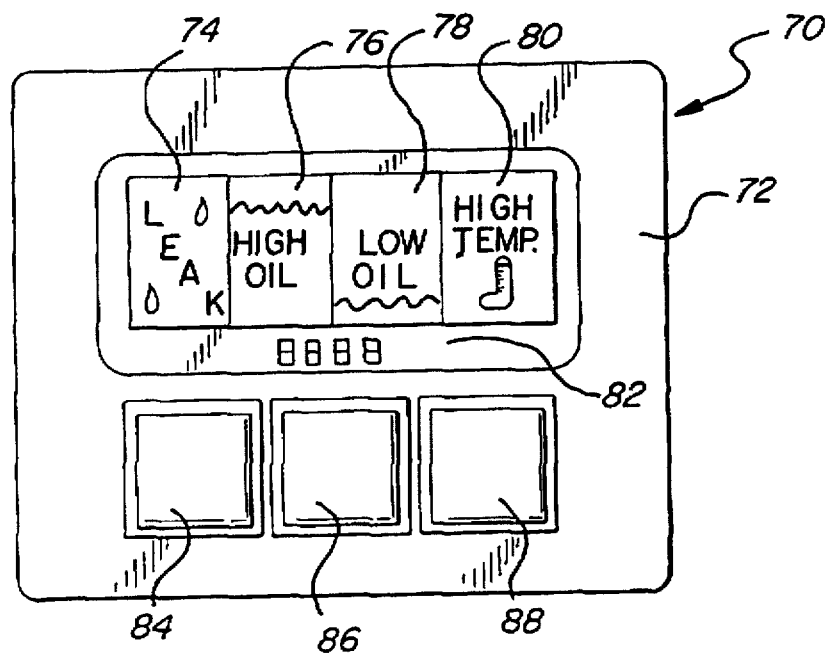
FIG. 6 is a plan view of the monitoring unit of the self-calibrating hydraulic fluid leak detection system of the present invention.

FIG. 6 illustrates the face of monitoring unit 70 for the leak detection system of the present invention. Monitoring unit 70 includes an annunciator panel 72 which includes a plurality of icons 74–80 for indicating the status of the hydraulic fluid system. For example, in the preferred embodiment, icons 80, 78, 76 and 74 are provided for indicating high fluid temperature, low fluid level, high fluid level and leak, respectively. Also, a numeric display 82 is provided for indicating the actual fluid level based upon the sensor reed switch closed or fluid temperature in engineering units. It should be understood that monitoring unit 70 is intended to be used outdoors and in sunlight and therefore that the icons 74–80 and display 82 should have sufficient illumination to be easily visible in sunlight. A plurality of membrane buttons 84–88 are also provided for allowing the turf machine operator to selectively view the system information and to calibrate the leak detection system. For example, pressing button 84 once displays temperature in degrees fahrenheit, pressing button 88 once displays the current fluid level in reed counts, pressing button 86 once clears the display, pressing and holding button 86 displays the calibration values, and pressing and holding all three buttons 84, 86, and 88 causes the calibrations to be written to the internal memory of the unit. In the preferred embodiment, monitoring unit 70, to be described further herein, is based upon a Motorola 6800 series microprocessor and includes at least one EEPROM memory device. Note that the monitoring unit 70 may be any of a number of microprocessors known to those skilled in the art. Further, the implementation and programming of the microprocessor are as typically appearing in the art and will be easily recognizable to those skilled in the art and need not be further described because from the following description, one could implement the subject invention.

Figure 7:
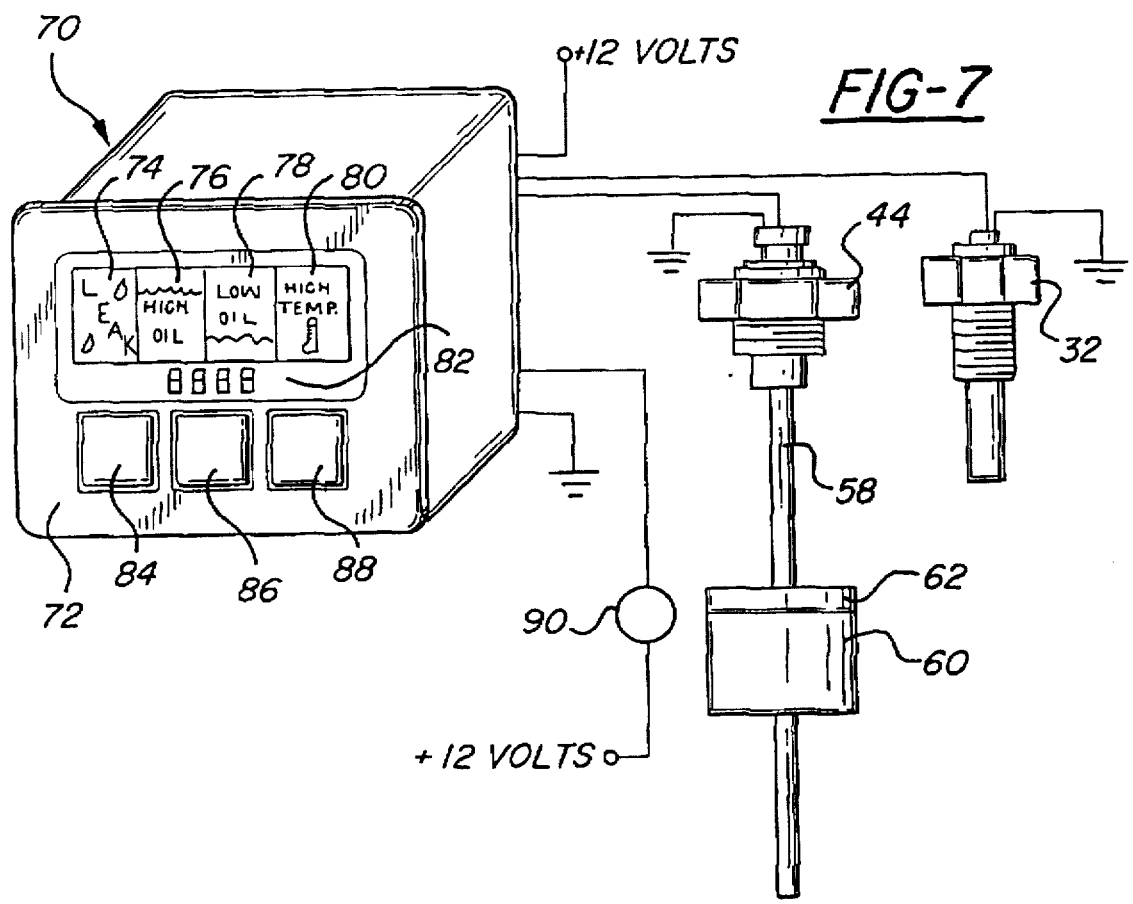
FIG. 7 is a schematic wiring diagram of the self-calibrating hydraulic fluid leak detection system of the present invention.

FIG. 7 illustrates the electrical connections of the hydraulic leak detection system. As can be seen, monitoring unit 70 is supplied with twelve (12) volts DC from the turf machine battery source and is grounded to the turf machine chassis. Level sensor 44 and temperature sensor 32 are each connected to monitoring unit 70, and a piezo (electric) buzzer 90 is provide and connected to monitoring unit for providing an audible warning. Referring to FIG. 12, a block diagram of monitoring unit 70 is depicted. Monitoring unit 70 generally includes a microprocessor 180 which executes programs 1 00 as are described in FIGS. 7–10. A microprocessor 180 communicates with a memory 182 which stores calibration data, to be described further herein. Inputs to the microprocessor 180 generally include the oil temperature, the fluid level, and various other inputs for executing the leak detection. Microprocessor 180 also outputs various signals and alarms for actuating various visual and audio alarms.

Figure 8:
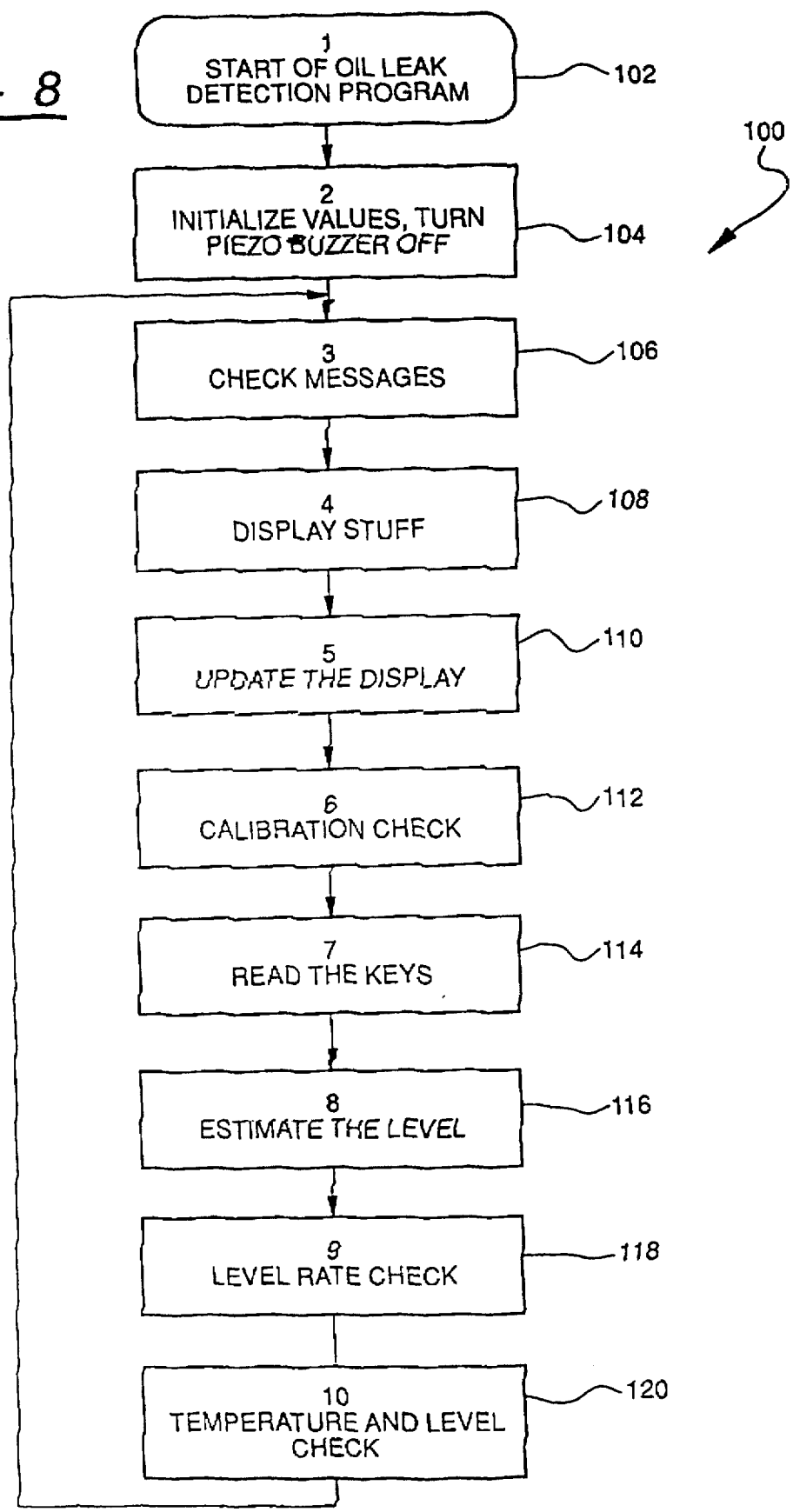
FIG. 8 is a flow chart illustrating the steps for determining a leak condition in the hydraulic fluid system of a typical turf machine in accordance with the method of the present invention.
Figure 9:
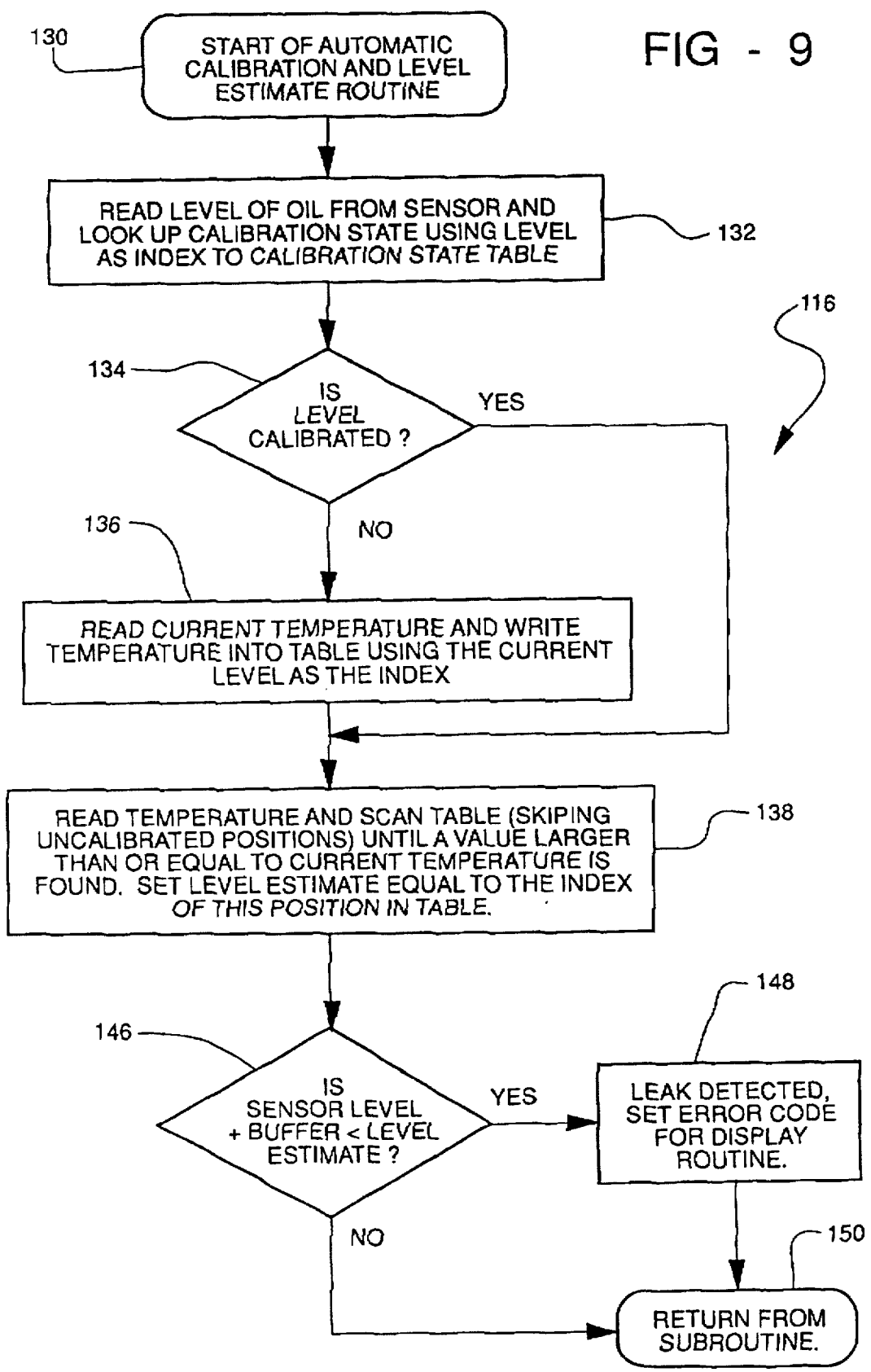
FIG. 9 is a flow chart further illustrating the steps for determining the level of fluid level within the expansion tank and for determining if a leak exists in accordance with the method of the present invention.
Figure 10:
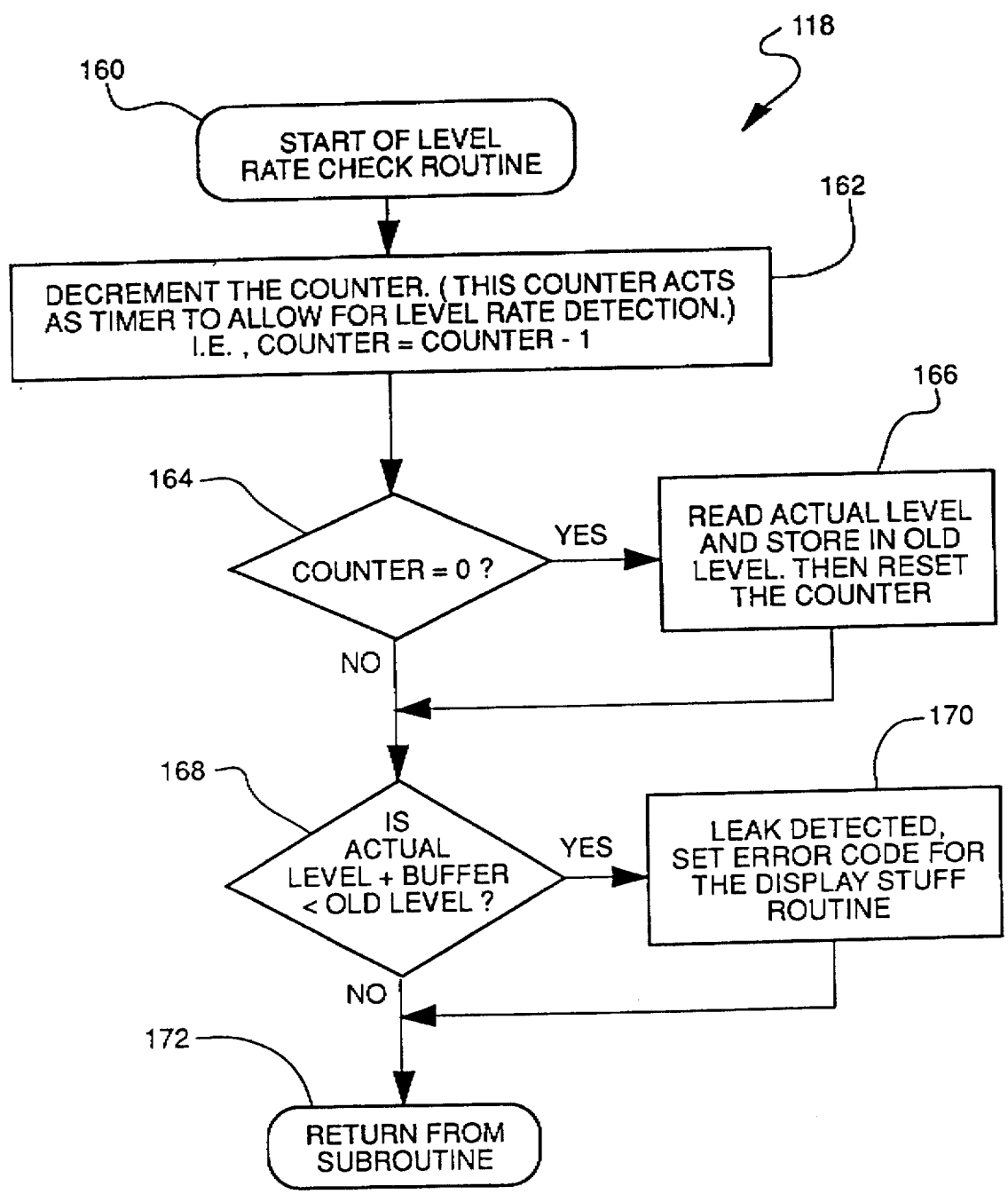
FIG. 10 is a flow chart illustrating the steps for determining the rate of change of the level of hydraulic fluid within the hydraulic fluid system of a typical turf machine in accordance with the method of the present invention.

With reference to FIGS. 8–10, the method 100 of monitoring the hydraulic fluid system of turf machine and for determining the existence of a leak will be described. The method enters at bubble 102 and proceeds to the INITIALIZE VALUES, TURN PIEZO BUZZER OFF block 104 at which an initiation routine is performed. During initialization, the selected saved values are retrieved from the EEPROM, the icons 74–80 are illuminated and the buzzer 90 is activated for approximately one second. The method then proceeds to the CHECK MESSAGES block 106. Messages are data from operator inputs via membrane buttons 84–88, or indications from the ESTIMATE THE LEVEL block 116 and LEVEL RATE CHECK block 118, which will be described below, that a leak has occurred. The method then proceeds to the DISPLAY STUFF block 108. At block 108 a display driver determines which icons 74–80 to illuminate and/or whether or not to activate piezo buzzer 90 in response to the messages and so activates the icons 74–80 and/or piezo buzzer 90. At the UPDATE THE DISPLAY block 110 an LCD display driver operates to display the most recent numeric values for the selected units, fluid level or fluid temperature, on numeric display 82.

The method then proceeds to the CALIBRATION CHECK block 112 where a software flag is checked to determine whether the operator has indicated that a calibration table reset should be performed. If the calibration flag is set, the calibration table is reset so that each position in the entire calibration table is set to a predetermined value. A calibration is requested by first holding button 84 until icon 74 is illuminated, then holding button 88 until icon 80 is illuminated and then holding buttons 84 and 88 simultaneously for three (3) seconds until "AUTO" appears on display 82. During calibration table reset, a map or table of the fluid temperature in reservoir 16 versus the fluid level in expansion tank 16 is reset so that each position stores a predetermined value which indicates that the position in the table has not been calibrated. To be explained in greater detail herein as the temperature of the fluid rises, the fluid level is monitored to provide a map of the fluid level versus temperature for a range of fluid levels and temperatures. This information is then stored in memory automatically while simultaneously performing leak detection. The procedure of pressing button 84 and then button 88 and then both buttons 84 and 88 provides a lock-out means to prevent unauthorized individuals from resetting the calibration table.

FIG. 13 depicts a map 190 which is exemplary of a map stored in memory 182 by microprocessor 180. As can be seen in FIG. 13, the map stores a hydraulic fluid (or oil) level and a corresponding hydraulic fluid (or oil) temperature. For example, if the oil level detected by the float sensor in expansion tank 16 (measured in counts) is measured at 40 counts, the temperature of the hydraulic fluid is approximately 50° F. Similarly, if the oil level in expansion tank 16 is 115 counts the oil temperature is approximately 100° F. Note that the table 190 of FIG. 13 is merely exemplary for providing oil levels and temperatures at various increments. An exemplary table may have between fifteen and forty index locations depending on the particular application. It will be understood by one skilled in the art that temperature stored depends on the fluid level at the specific temperature. Note that the temperature of the hydraulic fluid is initially at approximately ambient temperature. As the hydraulic system operates, the oil temperature rises and will eventually peak. Ideally, table 190 covers a range of temperatures and corresponding oil levels from the lowest possible ambient temperature to the highest possible oil temperature, typically 40° F. to 150° F., but the range may vary.

The method next proceeds to the READ THE KEYS block 114. The read the keys block 114 reads the membrane switches 84-88 and sets system flags, such as the calibration flag, display temperature flag, etc., so that the requested functions are performed. The method then proceeds to the ESTIMATE THE LEVEL block 116.

The ESTIMATE THE LEVEL BLOCK 116 executes a routine for determining the actual level of fluid in the expansion tank 16 and for comparing it to a level which is determined previously during calibration. FIG. 9 illustrates the steps of the estimate the level routine which enters at bubble 130 and then proceeds to READ LEVEL block 132 where the hydraulic level is determined by reading the level sensor 44. The output from level sensor 44 typically undergoes an A/D conversion so that the microprocessor interprets the level measured in counts, which serves as an index into the calibration state table, described in detail with respect to FIGS. 13. The calibration table is stored in an EEPROM memory, and the memory contents referenced by the index is a temperature, which is retrieved by the microprocessor. At diamond 1 34, the retrieved temperature is examined to verify that a calibration value has been stored for the oil level serving as an index. Typically, the memory positions which define the table are preset to a specified value, as described with respect to CALIBRATION CHECK block 112, which is either an improbable or illegal value. If the retrieved value is the preset value, no calibration has been stored for that oil level, and control proceeds to WRITE TEMPERATURE block 136. At WRITE TEMPERATURE block 136, the oil temperature is measured using the temperature sensor 32. The measured temperature is stored in the memory location indexed in accordance with level of the hydraulic fluid from READ LEVEL block 132.

If the level read at READ LEVEL block 132 is calibrated, or following WRITE TEMPERATURE block 136, control proceeds to READ/SCAN block 138 where the temperature measured by temperature sensor 32 is read and the table values are scanned until a temperature greater than or equal to the read temperature is located. The index value referencing the located temperature is then selected as the level estimate, i.e., the level corresponding to the temperature read as previously determined during calibration. At diamond 146 the estimated level is compared to the level read at block 132. If the estimated level is within a buffer value of the level read by level sensor 44 (the actual level), the buffer being based upon the desired sensitivity of the system which can be adjusted to allow small level differences between the estimated expansion tank level and the actual expansion tank level without triggering the alarm, of the actual level, then the routine is exited at bubble 150.

If the estimated level is not within a buffer value of the actual level, AT LEAK DETECTED block 148 an error code is set for the DISPLAY STUFF routine at block 108, and the routine is exited at bubble 150. After performing the ESTIMATE THE LEVEL routine at block 116, the method proceeds to the LEVEL RATE CHECK block 118. The level rate check routine is illustrated in FIG. 1 0, and it determines the rate at which the fluid level is changing within the system. If the level is changing too rapidly, a leak is indicated. With reference to FIG. 10, the level rate check routine enters at bubble 160 and proceeds to the DECREMENT COUNTER block 162. A counter is decremented by one unit each time through the routine. At diamond 164 if the counter is zero, the actual expansion tank level is read and saved as the old level, and the counter is reset at block 166.

At diamond 168 if the actual level is not within a buffer value of the old level, a leak is detected and at LEAK DETECTED block 170 an error code is set. The routine then exits at bubble 172.

At TEMPERATURE AND LEVEL CHECK BLOCK 120 the actual fluid temperature in reservoir 14 and the actual fluid level in expansion tank 16 are checked against system constants. If the actual temperature and level is above or below these constants, an error code is set to cause the DISPLAY STUFF routine at block 108 to illuminate the appropriate icon 74-80 and/or to activate the piezo buzzer 90. The method then loops back to CHECK MESSAGES block 104 and repeats. The method continuously loops during operation of turf machine 10 for detecting hydraulic fluid system operation and the presence of leaks.

FIG. 5 illustrates an alternative arrangement for expansion tank 16 and level sensor 44. In FIG. 5, expansion tank 16' is shown modified to accommodate two (2) level sensors 44a and 44b, respectively. As previously discussed, level sensor 44 has a plurality of switches spaced along shaft 58, and in the preferred embodiment, level sensors 44 is eleven (11) inches long with nine (9) switches spaced at one (1) inch intervals. Thus, level sensor 44 has a sensitivity of approximately one (1) inch. In FIG. 5, a pair of level sensors 44a and 44b are shown offset with respect to each other by approximately ½ inch, or ½ the sensitivity range of a single level sensor 44. The level sensors 44a and 44b are then wired in series to monitoring unit 70. As will be appreciated, this arrangement provides for ½ inch sensitivity or approximately twice the sensitivity of a single level sensor 44. In all other aspects the hydraulic fluid leak detection system of the present invention functions as described.

Figure 11:
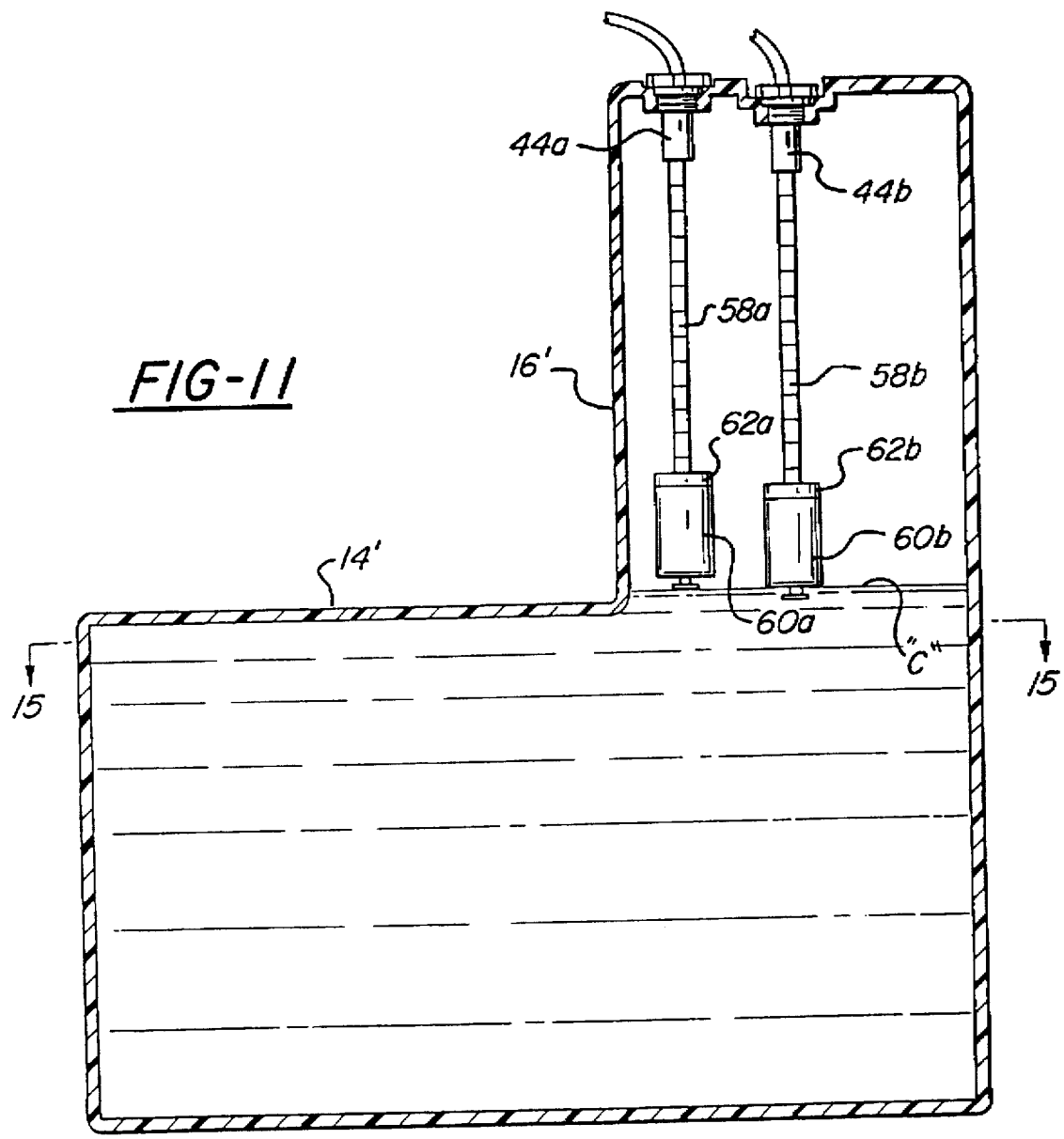
FIG. 11 is a sectional view through a reservoir and expansion tank according to an additional embodiment of the present invention.

FIG. 11 illustrates an alternate embodiment for the arrangement of reservoir 14 and expansion tank 16 wherein primed reference numerals are used to identify similar elements from the preceding embodiment. As can be seen from FIG. 11, expansion tank 16' is made integral to reservoir 14' such that hydraulic fluid contained in reservoir 14' is also in communication with expansion tank 16'. Float sensors 44a and 44b are shown disposed within expansion tank 16' for measuring the fluid level as described, the level for cold fluid being indicated at "C". As will be appreciated, as the hydraulic fluid is heated and expands, it will fill expansion tank 16', and as the fluid cools, it will contract back into reservoir 14'. It should also be understood that a single float sensor may be used depending on the required sensitivity of the leak detection system.

Referring to FIG. 14, a cross-sectional view of the expansion tank 16' and reservoir 14' depicted in FIG. 11 demonstrates a particularly advantageous feature of this invention. It will be noted that while this advantageous feature is demonstrated with reference to expansion tank 16' and reservoir 14' as shown in FIG. 14 the features are equally advantageously realized by the design of expansion tank 16 and reservoir 14 depicted in FIGS. 2-5. Assuming reservoir 14' of FIG. 14 has a surface area 196 and expansion tank 16' has a surface area 194, when the temperature of hydraulic system fluid in reservoir 14' rises and the fluid expands so that the fluid level C (depicted in FIG. 11) rises into expansion tank 16', the fluid level rise is multiplied due to the decreased surface area of expansion tank 16'. That is, because expansion tank 16' has a surface area 194 which is substantially less than the surface area 196 of reservoir 14', the increase in the fluid level C is greater in expansion tank 16' than would be if expansion tank 16' had a surface area equal to the surface area 196 of reservoir 14'. Further, the multiplicative effect of the decrease in surface area 194 of expansion tank 16' may be determined as a ratio between the surface area 196 of reservoir 14' to the surface area 194 of expansion tank 16'. For example, assume that the surface area 194 of reservoir 14' is 100 sq. in. and that the surface area 194 of reservoir 16' is 20 sq. in., then the ratio of the surface area 196 to the surface area 194 is 100:20 or 5:1. This necessarily implies that expansion tank 16' has a gain of 5 with respect to reservoir 14' and is thus more sensitive to changes in the fluid level C than reservoir 14'.

Note that while the foregoing description describes a self-calibrating leak detection system for implementation on turf care equipment, the principles of the present invention are equally applicable to any vehicle or machine possessing a hydraulically powered apparatus. For example, the system may be particularly applicable to construction equipment such as front end loaders, bulldozers, power shovels, and the like which rely on hydraulic power for operation. In particular, when such equipment experiences a leak of hydraulic fluid from the hydraulic system the losses attributed to equipment damaged by excessive, undetected fluid loss may be substantial. Such losses would be avoidable by implementing the self-calibrating hydraulic leak detection system as described above. Further, the self-calibrating leak detection system is equally applicable to machines that have regular mechanical drives or systems which use internal combustion engines but also utilize hydraulic power supplies to operate reels and reel lift equipment.

Figure 15:
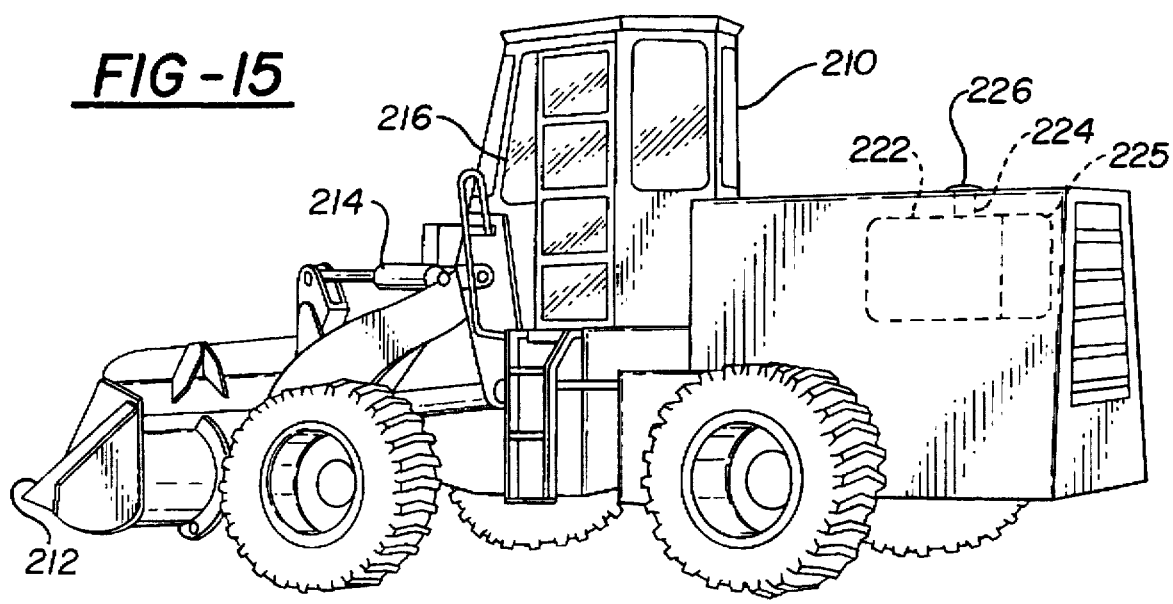
FIG. 15 is a perspective view of a hydraulically controlled front-loader vehicle having a hydraulic system and having the hydraulic fluid leak detection system implemented thereon to detect leaks in the hydraulic system according to the principles of the present invention.

For example, FIG. 15 depicts a front end loader 210 having a front scoop 212. A pair of hydraulic cylinders 214, one situated on either side of the front end loader 210, cooperate to control the movement of front scoop 212. It will be recognized by one skilled in the art that additional hydraulic cylinders (not shown) may further cooperate to control the operation of front scoop 212 in various degrees of freedom. Hydraulic cylinders 214 typically extend and retract in order to vertically raise and lower front scoop 212. Additional hydraulic cylinders (not shown) may cooperate to pivot front scoop 212 about other assorted axes. Typically, an operator located in the operator's cockpit 216 directs all movement of front end loader 210, including operation of hydraulic cylinders 214. With respect to the hydraulic system, the operator typically manipulates levers (not shown) found within the operator's cockpit 216. Manipulation of the various levers in turn typically generates electrical or mechanical control signals input to a hydraulic controller.

Figure 16:
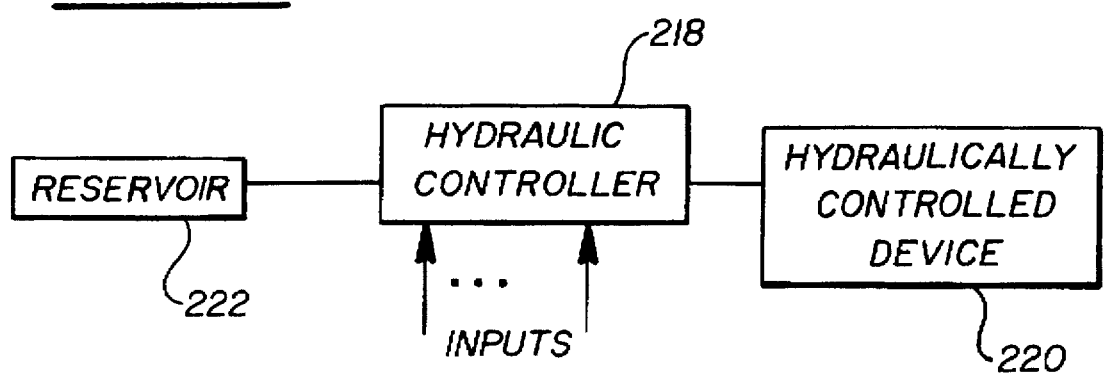
FIG. 16 is a block diagram of a typical hydraulic control system.

FIG. 16 depicts a block diagram of a hydraulic control system. A hydraulic controller 218 receives input control signals, where the control signals are generated in response manipulation of control levers by the operator. Hydraulic controller 218 receives and interprets the inputs in order to generate a corresponding control signal to actuate various devices associated with hydraulic controller 218. Hydraulic controller 218 modulates the hydraulic fluid flow to a hydraulically controlled device 220 to actuate the hydraulically controlled device 220. Hydraulic fluid is typically stored in a hydraulic fluid reservoir 222, and the hydraulic controller 218 modulates the fluid flow from the reservoir to the hydraulically controlled device 220. Referring to FIG. 15, hydraulic fluid reservoir 222 may be located as shown at the back of front end loader 210. The hydraulic fluid reservoir 222 typically includes a filler neck 224 and a filler cap 226. Replacement of hydraulic fluid in hydraulic reservoir 222 may be accomplished by removal of filler cap 226 followed by the addition of hydraulic fluid to reservoir 222 through filler neck 224.

Figure 17:
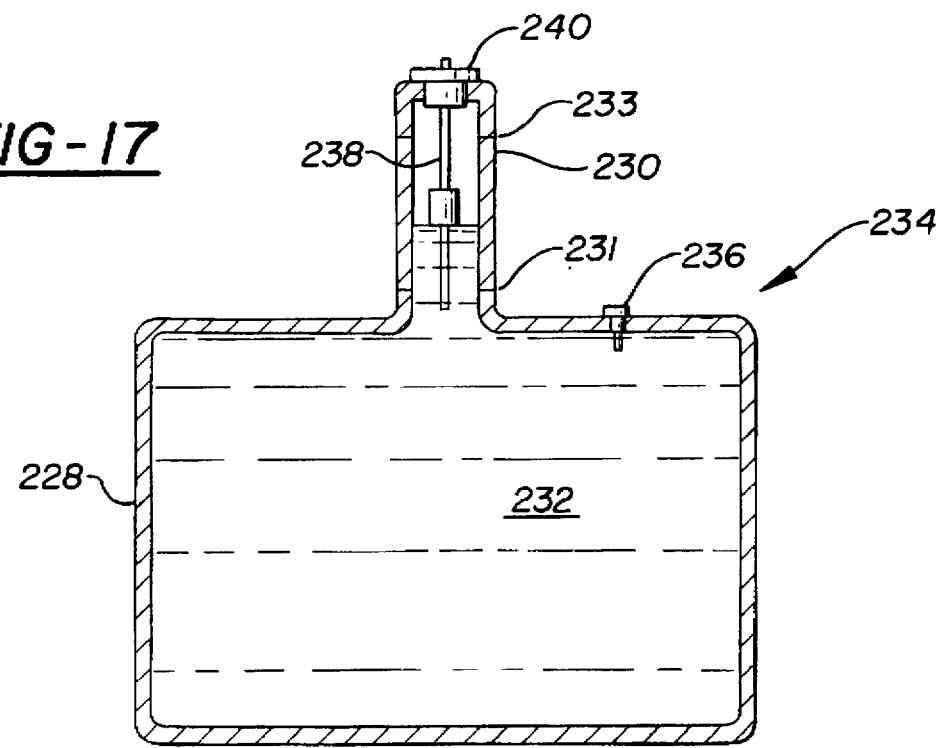
FIG. 17 is one embodiment of the tank and sensors for implementing the hydraulic fluid leak detection system on the front loader depicted in FIG. 15.

FIG. 17 depicts one embodiment of a particular hydraulic fluid reservoir 228 configured to implement the above-described hydraulic fluid leak detection system on, for example, front end loader 210. The configuration of FIG. 17 is similar to the configuration of previously-described FIG. 11. In FIG. 17, hydraulic fluid reservoir 228 is formed integrally with an accompanying expansion tank 230. In this manner, as described with respect to FIG. 11, the hydraulic fluid 232 found within reservoir 228 may expand into expansion tank 230. As previously described, a sufficient amount of hydraulic fluid 232 should be added to the system so that the reservoir 228 is substantially full and so that the hydraulic fluid partially overflows into expansion tank 230. The integral reservoir and expansion tank 234 also includes a temperature sensor 236 for sensing the temperature of the hydraulic fluid within the hydraulic system. The expansion tank 230 further includes a float sensor 238 for detecting the fluid level within expansion tank 230. Float sensor 238 projects downwardly from vented filler cap 240. Vented filler cap 240 is typically threaded onto the expansion tank 230 so that an operator adds fluid to the integral reservoir and expansion tank 234 via expansion tank 230. Filler cap 240 is preferably vented to allow the passage of air into and out of expansion tank 230 in accordance with the expansion and contraction of hydraulic fluid 232. Expansion tank 230 is preferably formed of a translucent material, such as any of a number of plastic materials well known in the art. The translucent material enables maintenance personnel to inspect the expansion tank 230 and to determine the level of the hydraulic fluid within the expansion tank. Expansion tank 230 may also be scored or otherwise marked with horizontal lines 231 and 233. Horizontal line 231 indicates to the operator or maintenance personnel a cold fill line above which the hydraulic fluid level should be when the hydraulic fluid temperature is at ambient. Correspondingly, horizontal line 233 can be used as a hot fill line below which the hydraulic fluid level should be under normal operating conditions. With respect to leak detection and calibration circuitry, the hydraulic fluid leak detection associated with the integral reservoir and expansion tank 234 operates as described above with respect to FIGS. 1–14.

It will be understood by one skilled in the art that the integral reservoir and expansion tank 234 may be substituted for reservoir 222 shown in FIG. 15. In this manner, the integral reservoir and expansion tank 234 comprise a retrofit hydraulic fluid leak detection system which may be easily substituted for reservoir 222 of FIG. 15 to upgrade the existing hydraulic control system of front end loader 210 into a self-calibrating hydraulic fluid leak detection system. It will be further understood by one skilled in the art that in order to fully implement the self-calibrating hydraulic fluid leak detection system on front end loader 210, a controller, such as that described with respect to FIGS. 6–10 must also be installed onto front end loader 210. It will yet be further understood that the functionality of such a controller may be optionally incorporated into hydraulic controller 218 of FIG. 16.

Figure 18:
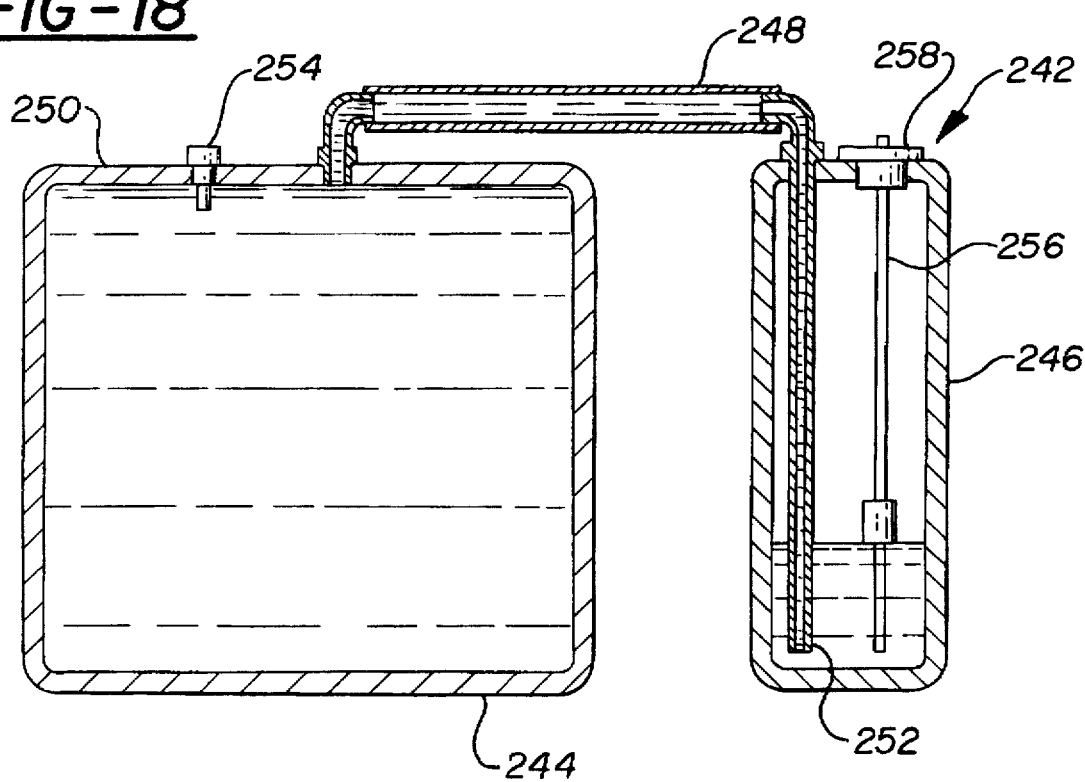
FIG. 18 is one embodiment of the retrofit, hydraulic fluid leak detection system, including a separate overflow reservoir for receiving overflow hydraulic fluid from the main reservoir when the hydraulic fluid within the main reservoir expands due to an increase in temperature.

FIG. 18 depicts another embodiment of a retrofit hydraulic fluid leak detection system. In this embodiment, a reservoir 244 and expansion tank 246 cooperate to define a non-integral reservoir and expansion tank 242. An expansion tube 248 interconnects to the top surface 250 of reservoir 244, preferably at the upper-most portion of reservoir 244. Expansion tube 248 is inserted into expansion tank 246. Within expansion tank 246, expansion tube 248 is inserted in close proximity to the bottom of expansion tank 246, preferably below the fluid level in expansion tank 246. The expansion tube 248 thus provides a siphoning effect as described above with respect to FIGS. 1–3. Of course, it will be understood by one skilled in the art that in order to effect a proper siphon, the end portion 252 of expansion tube 248 should be below the fluid level within expansion tank 246 and the reservoir 244 must be substantially filled with hydraulic fluid.

Reservoir 244 further includes a temperature sensor 254 for determining the temperature of the hydraulic fluid within the hydraulic system. A float sensor 256 in expansion tank 246 outputs a signal varying in accordance with the fluid level, and a vented, filler cap 258 enables air to pass into and out of expansion tank 246. The float sensor 256 is suspended from the filler cap 258 into expansion tank 246. The temperature sensor 254 and float sensor 256 cooperate with a controller as described with respect to FIGS. 6–10 to effect proper self-calibrating leak detection.

Figure 19:
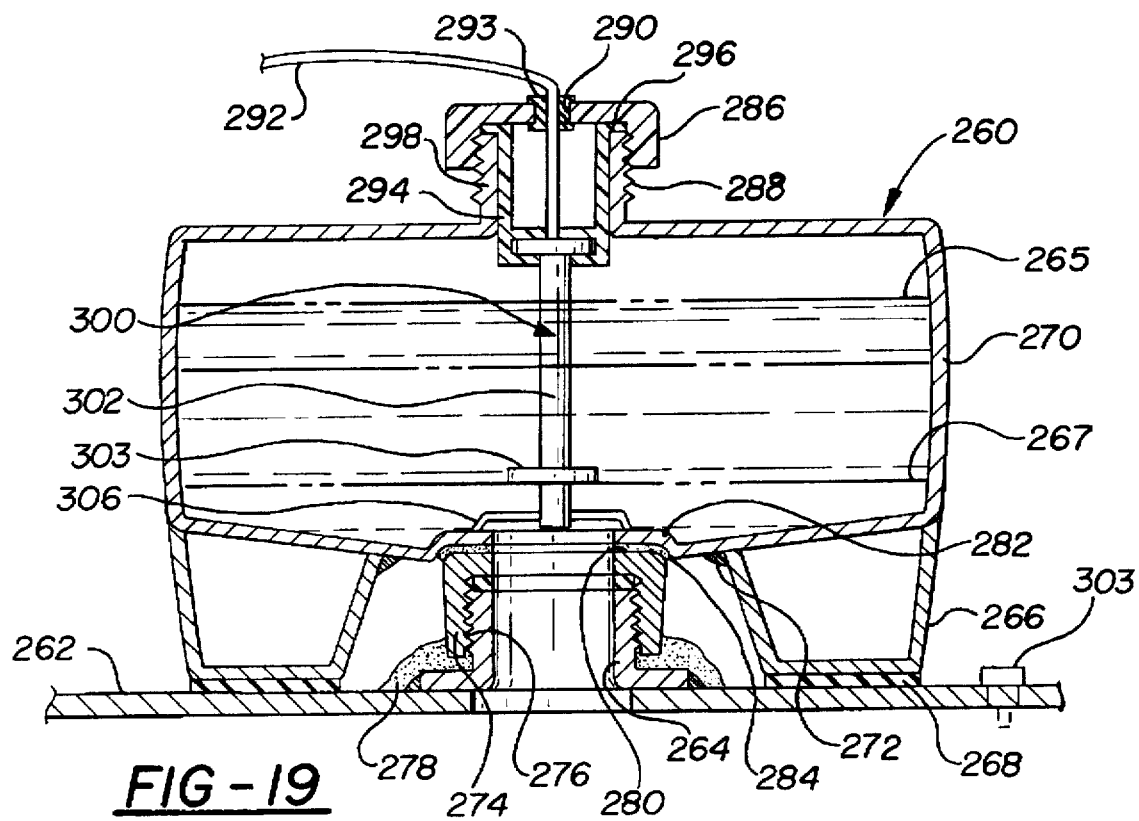
FIG. 19 is another embodiment of the retrofit hydraulic fluid leak detection system which attaches to the main reservoir via the filler nozzle of the main reservoir.

In some machinery utilizing hydraulic control, replacement of the entire reservoir may be either impractical or prohibitively expensive, necessitating an expansion tank which may be easily retrofit onto the existing reservoir in order to provide a self-calibrating hydraulic fluid leak detection system to monitor the hydraulic fluid level within the hydraulic system. FIG. 19 depicts a retrofit expansion tank system 260 which overcomes many disadvantages associated with implementing the self-calibrating hydraulic fluid leak detection system on devices utilizing hydraulic control where replacement of the reservoir is either impractical or prohibitively expensive. Retrofit expansion tank system 260 rests on the top surface of reservoir 262. The reservoir filler neck 264 provides a fluid passage between the expansion tank 270 and reservoir 262. In operation, a support brace 266 rests upon the top surface of reservoir 262. Optionally, annular support brace 266 rests upon a gasket 268, shown herein as an annular gasket. Annular gasket 268 is preferably a resilient material which provides mechanical dampening and reduces chafe between the top surface of reservoir 262 and support brace 266 to correspondingly limit vibration and provide shock absorption between the reservoir 262 and the expansion tank 270. Expansion tank 270 in turn rests upon support brace 266 and is fastened to support brace 266 via spot welds 272.

A threaded annular adapter 274 interconnects reservoir 262 and expansion tank 270 via threaded attachment to filler neck 264. The annular adapter 274 may be fastened to the filler neck 264 in conjunction with threads 276 using an oil-impervious epoxy 278 which prevents movement of the annular adapter 274 and also provides a fluidic seal between the lower portion of annular adapter 274 and filler neck 264. Annular adapter 274 also includes a top surface 280 which is shaped to provide suitable engagement with the bottom surface 282 of expansion tank 270. The substantially flush engagement between top surface 280 and bottom surface 282 assists in providing a fluidic seal between the expansion tank 270 and the annular adapter 274. A gasket or seal 284 may be placed between the annular adapter 274 and the bottom surface 282 of expansion tank 270 to further improve the fluidic seal. The retrofit expansion tank system 260 facilitates implementation of the self-calibrating hydraulic fluid leak detection system described herein. The user need only retrofit the expansion tank and the supporting control circuitry to implement self-calibrating hydraulic fluid leak detection. This significantly reduces the cost of implementing a self-calibrating leak detection system on hydraulically controlled equipment already having a reservoir.

The retrofit expansion tank system 260 further includes a filler cap 286 which threadably interconnects with the filler neck 298 of expansion tank 270 via threads 288. As shown in FIG. 19, filler cap 286 includes an annular bore 290 through which is passed a control wire 292. The control wire may optionally pass through a sealing material 293 which provides a fluidic seal and may also enable air passage into and out of expansion tank 270. Filler cap 286 also assists in maintaining float sensor bracket 294 substantially in place. Float sensor bracket 294 includes an annular ring 296 interposed between filler cap 286 and the top surface of expansion tank filler neck 298. When filler cap 286 is tightened, float sensor bracket 294 is snugly seated onto the top surface of filler neck 298. For further support, float sensor bracket 294 is sized substantially similarly to the inner diameter of expansion tank filler neck 298 to prevent radial translation of float sensor 300.

Float sensor 300 comprises a substantially vertically aligned rod 302 on which a float 303 vertically translates in accordance with the fluid level in expansion tank 270. The distal end of rod 302 is supported by rod support 306. Rod support 306 cooperates with float sensor bracket 294 to limit radial movement of float sensor 300. The operation of float sensor will be understood as described with respect to FIGS. 1–14. In addition a temperature sensor 308 may be mounted onto the top surface of reservoir 262 to sense the temperature of the hydraulic fluid. Of course, it will be understood by one skilled in the art that temperature sensor 308 should typically contact the hydraulic fluid in order to properly monitor temperature of the fluid within the hydraulic system.

The retrofit expansion tank system 260 utilizes the expansion properties of hydraulic fluid to detect leaks in the hydraulic system. When the hydraulic fluid heats and expands, the hydraulic fluid expands through the filler neck 264 of reservoir 262 into expansion tank 270. As described above with respect to FIGS. 1–14, magnitude of the expansion of hydraulic fluid within expansion tank 270 and the temperature of the hydraulic fluid enables the controller to calculate whether a leak exists in the hydraulic system. Typically hydraulic fluid expands at a rate of approximately 0.001 inches per degree fahrenheit. In operation, the add-on expansion tank system 260 utilizes the expansive properties of hydraulic fluid such that when the hydraulic fluid heats and expands, the hydraulic fluid expands through the filler neck 264 of reservoir 262 and into expansion tank 270. The rise and fall of hydraulic fluid within expansion tank 270, in conjunction with the detected temperature variations of the hydraulic fluid, enables the determination of whether a leak exists in the hydraulic system, as described with respect to FIGS. 1–14.

Expansion tank 270 may be made of translucent plastic to facilitate inspection of the hydraulic fluid by the operator. Alternatively, the expansion tank 270 may include in one portion a translucent sight gauge to facilitate inspection of the hydraulic fluid. In addition, annular support brace 266 may be three separate support bases arranged angularly to properly support expansion tank 270. Alternatively, annular support brace 266 may be a continuous annular base to provide support in addition to a three point support as provided by three separate base pieces.

Figure 20:
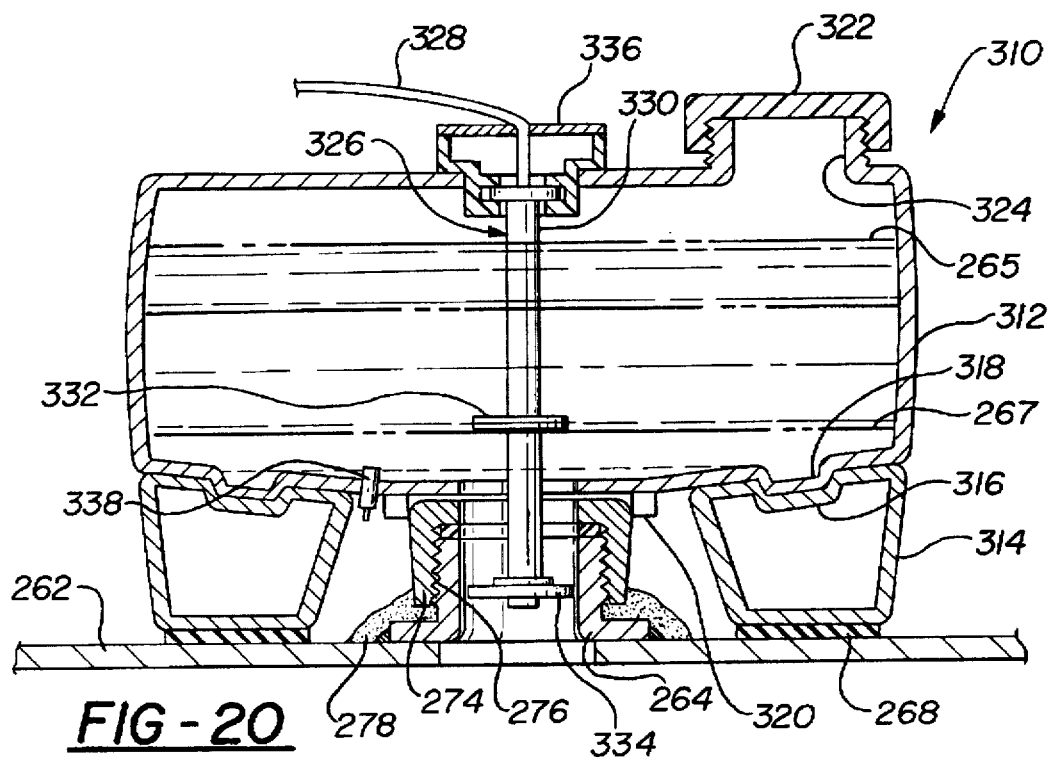
FIG. 20 is yet another embodiment of the retrofit hydraulic fluid leak detection system which attaches to the main reservoir.

FIG. 20 depicts yet another embodiment for a retrofit expansion tank system 310. It should be noted that like reference numerals from FIG. 19 will be used to refer to similar elements in FIG. 20. As described with respect to FIG. 19, add-on expansion tank 312 sits on the top surface of reservoir 262. Reservoir 262 includes a filler neck 264 which provides a fluid passage between the reservoir 262 and the expansion tank 312. As described with respect to FIG. 19, annular support brace 314 is seated onto an optional gasket 268 which provides vibration dampening between reservoir 262 and the retrofit expansion tank assembly 310.

The annular support brace 314 also includes a recess 316 which receives a correspondingly shaped retaining ring 318 projecting downwardly from expansion tank 312. Retaining ring 318 may be formed on expansion tank 312 during the manufacture of expansion tank 312 or attached separately thereto. Recesses 316 and retaining ring 318 provide engagement between the expansion tank 312 in the annular support brace 314. Such engagement provides an alternative for spot welding the expansion tank 312 to support brace 314 to maintain expansion tank 312 in an installed position.

As described above with respect to FIG. 19, a fluid tight interconnection between the reservoir 262 and the expansion tank 312 may be accomplished using a threaded, annular adapter 274 which interconnects with filler neck 264 via threads 276. The interconnection may be further sealed using an oil-impervious epoxy 278. Annular ring 320 further provides a fluid tight seal between expansion tank 312 and annular adapter 274.

Expansion tank 312 also includes a filler cap 322 which threadably interconnects to a filler neck 324. Filler cap 322 is preferably vented to allow air passage into and out of expansion tank 312. A float sensor assembly 326 is attached to expansion tank 312 and provides fluid level information for performing leak detection. Float sensor assembly 326 includes a sensor wire 328, a rod 330 and a float 332. The float sensor operates as described above with respect to FIGS. 1-14. Float sensor rod 330 descends into the interior of filler neck 264. At the end of float sensor rod 330, an annular spacer 334 attaches to float sensor rod 330. Annular spacer 334 preferably has several apertures to enable a relatively uninhibited fluid flow between reservoir 262 and expansion tank 312. Annular spacer 334 helps to limit radial motion of float sensor assembly 326 by contacting the interior walls of filler neck 264. Float sensor assembly 326 may be permanently installed in expansion tank 312 via a fitting 336 which provides a fluidic seal. Alternatively, fitting 336 may be thread into expansion tank 312 to facilitate installation and removal of float sensor assembly 326. Expansion tank 312 also includes an internal temperature sensor 338 which enables temperature sensing of the fluid within the expansion tank. Temperature sensor 338 may operate in conjunction with a temperature sensor sensing the fluid temperature within the reservoir 262 or, alternatively, may be the only temperature sensor for sensing the hydraulic fluid temperature.

Similarly as described above, expansion tank 312 may be made of translucent plastic to facilitate inspection of the hydraulic fluid by the operator. In addition, annular support brace 314 may be comprised of a plurality of support braces arranged annularly to suitably support expansion tank 312 at a plurality of points. Alternatively, annular support brace 314 may be a continuous annular brace to provide continuous annular support. Referring to FIGS. 19 and 20, each expansion tank preferably has a cold fill indicator 267 and a hot fill indicator 265. The cold fill indicator 267 preferably delimits the minimum amount of fluid which should be in the respective expansion tank. The hot fill indicator 265 delimits the maximum amount of fluid which should be in the respective expansion tank during normal operating conditions.

Figure 21:
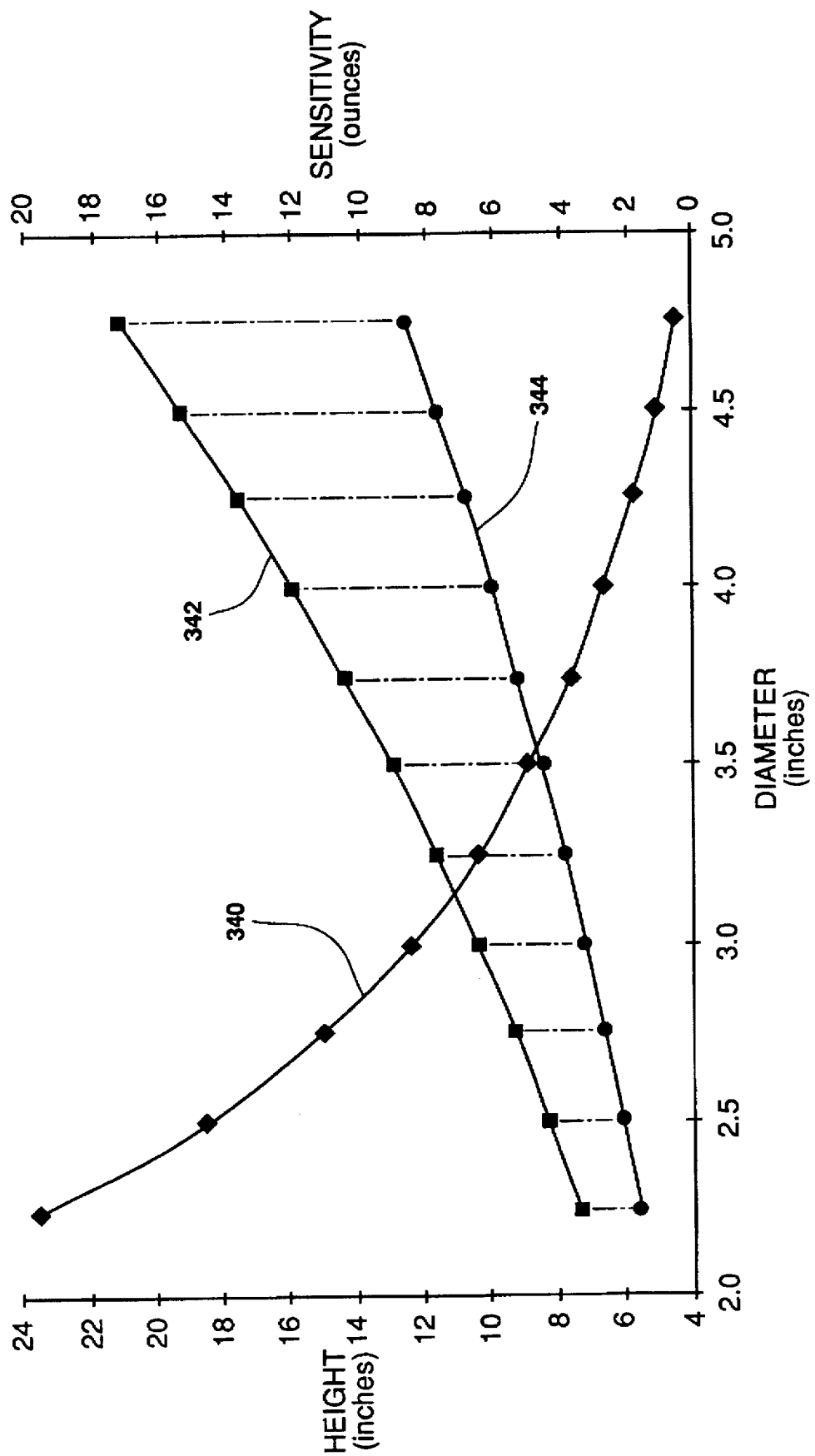
FIG. 21 is a graph which illustrates the sensitivity of the hydraulic fluid leak detection system as a function of the size of the overflow reservoir.

FIG. 21 depicts an exemplary graph of the relationship between the height and diameter of the expansion tank 230 of FIG. 17 and the associated sensitivity of the system. Plot 340 graphically illustrates the trade-off between the height versus the diameter of the expansion tank 230 for a fixed tank volume. For example, an expansion tank having a volume of 40 ounces and having a diameter of 2.5 inches will have a corresponding height of approximately 24 inches. An expansion tank having a diameter of 4.5 inches may have a height of approximately 5 inches. This variation between expansion tank height and diameter results in a corresponding variation in the sensitivity of the system. Plots 342 and 344 demonstrate the corresponding range of sensitivity in ounces, as shown along the right vertical axis of FIG. 21, for various diameters and heights for a fixed volume. Plot 342 demonstrates the high sensitivity range for an expansion tank having a specific diameter and height. Similarly, plot 344 demonstrates the low range of the sensitivity for an expansion tank having a particular diameter and height. The sensitivity defined herein refers to the range, in ounces, of hydraulic fluid which may be lost before a leak is detected by the system. For example, assuming that the expansion tank 230 has a diameter of 3.5 inches and a corresponding height of approximately 8 inches, the greatest sensitivity expected from the hydraulic fluid leak detection system is approximately 5 ounces while the lowest sensitivity for the hydraulic fluid leak detection system is approximately 10 ounces of lost hydraulic fluid. That is, for a 40 ounce expansion tank having a diameter of 3.5 inches and a height of approximately 10 inches, the hydraulic fluid leak detection system will detect a leak upon the loss of between 5 and 10 ounces of hydraulic fluid. While FIG. 21 provides a generalized indication of the sensitivity of the hydraulic fluid leak detection system, it will be understood by one skilled in the art that the sensitivity may be increased by using multiple float sensors as described above with respect to FIG. 11.

While specific embodiments have been shown and described in detail to illustrate the principles of the hydraulic leak detection system of the present invention, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the invention as described in the following claims.

What is claimed is:

1. A hydraulic fluid leak detection system for a self-propelled vehicle or self-propelled machine including a hydraulic system having a hydraulically actuated device and a reservoir of hydraulic fluid, the leak detection system comprising:

an expansion tank in fluid communication with the reservoir;

a first sensor disposed within the expansion tank and operable for sensing the hydraulic fluid level in the expansion tank over a range of possible fluid levels in the expansion tank and for producing a first signal varying in accordance with the hydraulic fluid level;

a second sensor operable for sensing the temperature level of the hydraulic fluid in the reservoir and for producing a second electronic signal corresponding thereto;

electronic processing means for receiving the first and second signals and for determining from the first and second signals if a leak exists in the hydraulic system; and means for indicating to an operator that a leak exists in the hydraulic system.

2. The hydraulic fluid leak detection system of claim 1 wherein the expansion tank is formed at least in part of a substantially translucent material so that an operator may inspect the hydraulic fluid within the expansion tank.

3. The hydraulic fluid leak detection system of claim 1 wherein the expansion tank and reservoir are formed at least in part of a substantially translucent material so that an operator may inspect the hydraulic fluid within each of the expansion tank and reservoir.

4. The hydraulic fluid leak detection system of claim 1 wherein the reservoir and the expansion tank are integrally formed to define one tank having a reservoir portion and an expansion portion.

5. The hydraulic fluid leak detection system of claim 1 wherein the reservoir and the expansion tank define two discreet tanks and a conduit communicates fluid between the reservoir and the expansion tank.

6. The hydraulic fluid leak detection system of claim 1 further comprising a filler neck projecting from the reservoir, and the expansion tank is formed to fluidly communicate with the reservoir through the filler neck.

7. The hydraulic fluid leak detection system of claim 1 further comprising:
 a filler neck projecting from the reservoir, and the expansion tank is formed to fluidly communicate with the reservoir through the filler neck; and
 a filler neck adaptor for interconnecting the filler neck of the reservoir to the expansion tank.

8. The hydraulic fluid leak detection system of claim 7 wherein the adaptor may be of varying sizes and shapes to suitably connect filler necks of corresponding sizes and shapes to an expansion tank having a predetermined size and shape.

9. The hydraulic fluid leak detection system of claim 7 wherein the filler neck and adaptor threadably interconnect.

10. The hydraulic fluid leak detection system of claim 7 wherein the adaptor and the expansion tank are shaped to form a substantially fluidic seal when interconnected.

11. The hydraulic fluid leak detection system of claim 1 further comprising an expansion tank support positioned upon the reservoir, the expansion tank being substantially seated upon the expansion tank support to support the expansion tank above the reservoir.

12. The hydraulic fluid leak detection system of claim 11 wherein the expansion tank support is a generally annular support.

13. The hydraulic fluid leak detection system of claim 11 wherein the expansion tank support includes a plurality of supports which support the expansion tank above the reservoir at a plurality of points.

14. The hydraulic fluid leak detection system of claim 1 further comprising:
 a first visible marking on the expansion tank to indicate a minimum fill level at a first temperature; and
 a second visible marking on the expansion tank to indicate a maximum fill level at a second temperature.

15. The hydraulic fluid leak detection system of claim 14 wherein the first temperature indicates a cold fluid level, and the second temperature is associated with a hot fluid level.

16. The hydraulic fluid leak detection system of claim 1 wherein the fluid passage connects the reservoir and the expansion tank, and the fluid passage is located in proximity to a center of the expansion tank.

17. The hydraulic fluid leak detection system of claim 16 wherein the expansion tank is cylindrically shaped and the fluid passage is substantially in the center of the expansion tank in order to limit sloshing of the hydraulic fluid in the expansion tank.

18. The hydraulic fluid leak detection system of claim 1 wherein:
 the first and second signals are electronic signals; and the processing means is further operable for determining if the hydraulic fluid level within the system is below a predefined normal operating level.

19. The hydraulic fluid leak detection system of claim 1 wherein the processing means is further operable for determining if the hydraulic fluid level within the system is above a predefined normal operating level.

20. The hydraulic fluid leak detection system of claim 1 wherein the processing means is further operable for determining if the hydraulic fluid temperature within the system is above a predefined normal operating range.

21. The hydraulic fluid leak detection system of claim 1 wherein the processing means is operable to determine an estimated level of fluid within the expansion tank and for comparing the estimated level of fluid to an actual fluid level determined by the first sensor for signalling the presence of a leak.

22. The hydraulic fluid leak detection system of claim 1 wherein the processing means is operable to determine a rate of change of the fluid level within the expansion tank and for comparing the determined rate of change to an allowable rate of change for signalling the presence of a leak.

23. The hydraulic fluid leak detection system of claim 1 wherein the first sensor comprises a float sensor.

24. The hydraulic fluid leak detection system of claim 1 wherein the first sensor comprises a plurality of float sensors, the float sensors being disposed in an offset relationship with respect to each other.

25. The hydraulic fluid leak detection system of claim 1 wherein the second sensor is disposed within the reservoir.

26. The hydraulic fluid leak detection system as in claim 5 wherein the conduit includes an elongated tube structure.

27. The hydraulic fluid leak detecting system as in claim 26 wherein the reservoir, expansion tank and tube structure are cooperatively arranged and positioned such that the fluid is siphoned from the expansion tank through the tube structure to the reservoir when the fluid in the reservoir cools.

28. A hydraulic fluid leak detection system for a self-propelled land vehicle or self-propelled machine including a hydraulic system having a hydraulically actuated device and a reservoir of hydraulic fluid, the system comprising:
 an expansion tank disposed adjacent and in communication with the reservoir;
 a first sensor disposed within the expansion tank, the first sensor operable for sensing the level of hydraulic fluid in the expansion tank and for producing a first electronic signal corresponding thereto;
 a second sensor operable for sensing the temperature of the hydraulic fluid in the reservoir and for producing a second electronic signal corresponding thereto;
 memory for storing the level of hydraulic fluid in the expansion tank and for storing the temperature of the hydraulic fluid in the reservoir, the memory storing a map which associates the hydraulic fluid level with a corresponding hydraulic fluid temperature;
 processing means for receiving the electronic signals and for determining from the first and second electronic signals if a leak exists in the hydraulic system; and
 means for indicating to an operator that a leak exists in the hydraulic system.

29. The hydraulic fluid leak detection system of claim 28 wherein the expansion tank is formed at least in part of a substantially translucent material so that an operator may inspect the hydraulic fluid within the expansion tank.

30. The hydraulic fluid leak detection system of claim 28 wherein the expansion tank and reservoir are formed at least in part of a substantially translucent material so that an operator may inspect the hydraulic fluid within each of the expansion tank and reservoir.

31. The hydraulic fluid leak detection system of claim 28 wherein the reservoir and the expansion tank are integrally formed to define one tank having a reservoir portion and an expansion portion.

32. The hydraulic fluid leak detection system of claim 28 wherein the reservoir and the expansion tank define two discreet tanks and a conduit communicates fluid between the reservoir and the expansion tank.

33. The hydraulic fluid leak detection system of claim 28 further comprising a filler neck projecting from the reservoir, and the expansion tank is formed to fluidly communicate with the reservoir through the filler neck.

34. The hydraulic fluid leak detection system of claim 28 further comprising:
a filler neck projecting from the reservoir, and the expansion tank is formed to fluidly communicate with the reservoir through the filler neck; and
a filler neck adaptor for interconnecting the filler neck of the reservoir to the expansion tank.

35. The hydraulic fluid leak detection system of claim 34 wherein the adaptor may be of varying sizes and shapes to suitably connect filler necks of corresponding sizes and shapes to an expansion tank having a predetermined size and shape.

36. The hydraulic fluid leak detection system of claim 34 wherein the filler neck and adaptor threadably interconnect.

37. The hydraulic fluid leak detection system of claim 34 wherein the adaptor and the expansion tank are shaped to form a substantially fluidic seal when interconnected.

38. The hydraulic fluid leak detection system of claim 28 further comprising an expansion tank support positioned upon the reservoir, the expansion tank being substantially seated upon the expansion tank support to support the expansion tank above the reservoir.

39. The hydraulic fluid leak detection system of claim 38 wherein the expansion tank support is a generally annular support.

40. The hydraulic fluid leak detection system of claim 38 wherein the expansion tank support includes a plurality of supports which support the expansion tank above the reservoir at a plurality of points.

41. The hydraulic fluid leak detection system of claim 28 further comprising:
a first visible marking on the expansion tank to indicate a minimum fill level at a first temperature; and
a second visible marking on the expansion tank to indicate a maximum fill level at a second temperature.

42. The hydraulic fluid leak detection system of claim 41 wherein the first temperature indicates a cold fluid level, and the second temperature is associated with a hot fluid level.

43. The hydraulic fluid leak detection system of claim 42 wherein the fluid passage connects the reservoir and the expansion tank and the fluid passage is located in proximity to a center of the expansion tank.

44. The hydraulic fluid leak detection system of claim 43 wherein the expansion tank is cylindrically shaped and the fluid passage is substantially in the center of the expansion tank in order to limit sloshing of the hydraulic fluid in the expansion tank.

45. The hydraulic fluid leak detection system of claim 28 wherein the vehicle or machine is a turf care machine.

46. The hydraulic fluid leak detection system of claim 45 wherein the fluid temperature and a corresponding fluid level are stored while performing leak detection.

47. The hydraulic fluid leak detection system of claim 46 wherein the map is stored in memory and is reset in response to a request to recalibrate the system.

48. The hydraulic fluid leak detection system of claim 47 wherein an operator initiates the calibration process.

49. The hydraulic fluid leak detection system of claim 48 wherein the processing means detects leaks during the operation of the hydraulic system and during transport of the vehicle or machine.

50. The hydraulic fluid leak, detection system of claim 49 wherein an operator may compensate for a change of shape of the expansion tank by recalibrating the system.

51. The hydraulic fluid leak detection system of claim 28 wherein the expansion tank covers a first horizontal area and the reservoir covers a second horizontal area, and the first horizontal area is less than the second horizontal area to effect a multiplication of the change in fluid level of the reservoir in accordance with a ratio of the horizontal areas.

52. The hydraulic fluid leak detection system of claim 28 wherein the expansion tank includes a flared section at the top to accommodate fluid overflow.

53. The hydraulic fluid leak detection system of claim 28 wherein the processing means is further operable for determining if the hydraulic fluid level within the system is below a predefined normal operating level.

54. The hydraulic fluid leak detection system of claim 28 wherein the processing means is further operable for determining if the hydraulic fluid level within the system is above a predefined normal operating level.

55. The hydraulic fluid leak detection system of claim 28 wherein the processing means is further operable for determining if the hydraulic fluid temperature within the system is above a predefined normal operating range.

56. The hydraulic fluid leak detection system of claim 28 wherein the processing means is operable to determine a rate of change of the fluid level within the expansion tank and for comparing the determined rate of change to an allowable rate of change for signalling the presence of a leak.

57. The hydraulic fluid leak detection system of claim 28 wherein the first sensor comprises a float sensor.

58. The hydraulic fluid leak detection system of claim 57 wherein the float sensor is centrally located within the expansion tank.

59. The hydraulic fluid leak detection system of claim 28 wherein the first sensor comprises a plurality of float sensors, the float sensors being disposed in an offset relationship with respect to each other.

60. A self-propelled land vehicle or self-propelled machine, comprising:
a hydraulically operated device;
a reservoir for hydraulic fluid for operating the hydraulically operated device;
an expansion tank in fluid communication with the reservoir;
a first sensor disposed within the expansion tank, the first sensor operable for sensing the level of hydraulic fluid in the expansion tank and for producing a first electronic signal corresponding thereto;
a second sensor operable for sensing the temperature of the hydraulic fluid in the reservoir and for producing a second electronic signal corresponding thereto;
electronic processing means for receiving the electronic signals and for determining from the first and second electronic signals if a leak exists in the hydraulic fluid system.

61. The vehicle of claim 60 further comprising a memory for storing the level of hydraulic fluid in the expansion tank and for storing the temperature of the hydraulic fluid in the reservoir.

62. The vehicle of claim 60 further comprising means for indicating to an operator that a leak exists in the hydraulic fluid system, thereby effecting a hydraulic fluid leak detection system.

63. The hydraulic fluid leak detection system of claim 61 wherein the memory stores a map associating with each stored hydraulic fluid level a corresponding fluid temperature.

64. The hydraulic fluid leak detection system of claim 60 wherein the expansion tank covers a first horizontal area and the reservoir covers a second horizontal area, and the first horizontal area is less than the second horizontal area to effect a multiplication of the change in fluid level of the reservoir in accordance with a ratio of the horizontal areas.

65. The hydraulic fluid leak detection system of claim 60 wherein the expansion tank includes a flared section at the top to accommodate fluid overflow.

66. The hydraulic fluid leak detection system of claim 60 wherein the processing means is further operable for determining if the hydraulic fluid level within the system is below a predefined normal operating level.

67. The hydraulic fluid leak detection system of claim 60 wherein the processing means is further operable for determining if the hydraulic fluid level within the system is above a predefined normal operating level.

68. The hydraulic fluid leak detection system of claim 60 wherein the processing means is further operable for determining if the hydraulic fluid temperature within the system is above a predefined normal operating range.

69. The hydraulic fluid leak detection system of claim 60 wherein the processing means is operable to determine a rate of change of the fluid level within the expansion tank and for comparing the determined rate of change to an allowable rate of change for signalling the presence of a leak.

70. A retrofit hydraulic fluid leak detection system for installation on a self-propelled vehicle or self-propelled machine having a hydraulically actuated device and fluid reservoir for supplying fluid for operating the hydraulically actuated device, comprising:

an expansion tank in fluid communication with the reservoir, the expansion tank being adaptable for installation on the vehicle;

a first sensor disposed within the expansion tank and operable for sensing the hydraulic fluid level in the expansion tank over a range of possible fluid levels in the expansion tank and for producing a first signal varying in accordance with the hydraulic fluid level;

a second sensor operable for sensing the temperature level of the hydraulic fluid in the reservoir and for producing a second electronic signal corresponding thereto;

electronic processing means for receiving the first and second signals and for determining from the first and second signals if a leak exists in the hydraulic system; and means for indicating to an operator that a leak exists in the hydraulic system.

71. The vehicle of claim 70 wherein the expansion tank is formed at least in part of a substantially translucent material so that an operator may inspect the hydraulic fluid within the expansion tank.

72. The vehicle of claim 70 wherein the expansion tank and reservoir are formed at least in part of a substantially translucent material so that an operator may inspect the hydraulic fluid within each of the expansion tank and reservoir.

73. The vehicle of claim 70 wherein the reservoir and the expansion tank are integrally formed to define one tank having a reservoir portion and an expansion portion.

74. The vehicle of claim 70 wherein the reservoir and the expansion tank define two discreet tanks and a conduit communicates fluid between the reservoir and the expansion tank.

75. The vehicle of claim 70 further comprising a filler neck projecting from the reservoir, and the expansion tank is formed to fluidly communicate with the reservoir through the filler neck.

76. The vehicle of claim 70 further comprising:

a filler neck projecting from the reservoir, and the expansion tank is formed to fluidly communicate with the reservoir through the filler neck; and a filler neck adaptor for interconnecting the filler neck of the reservoir to the expansion tank.

77. The vehicle of claim 76 wherein the adaptor may be of varying sizes and shapes to suitably connect filler necks of corresponding sizes and shapes to an expansion tank having a predetermined size and shape.

78. The vehicle of claim 76 wherein the filler neck and adaptor threadably interconnect.

79. The vehicle of claim 76 wherein the adaptor and the expansion tank are shaped to form a substantially fluidic seal when interconnected.

80. The vehicle of claim 70 further comprising an expansion tank support positioned upon the reservoir, the expansion tank being substantially seated upon the expansion tank support to support the expansion tank above the reservoir.

81. The vehicle of claim 80 wherein the expansion tank support is a generally annular support.

82. The vehicle of claim 80 wherein the expansion tank support includes a plurality of supports which support the expansion tank above the reservoir at a plurality of points.

83. The vehicle of claim 70 further comprising:

a first visible marking on the expansion tank to indicate a minimum fill level at a first temperature; and a second visible marking on the expansion tank to indicate a maximum fill level at a second temperature.

84. The vehicle of claim 83 wherein the first temperature indicates a cold fluid level, and the second temperature is associated with a hot fluid level.

85. The vehicle of claim 70 wherein the expansion tank includes a fluid passage between the reservoir and the expansion tank, and the fluid passage is located in proximity to a center of the expansion tank.

86. The vehicle of claim 70 wherein the expansion tank is cylindrically shaped and the fluid passage is substantially in the center of the expansion tank in order to limit sloshing of the hydraulic fluid in the expansion tank.

* * * * *

UNITED STATES PATENT AND TRADEMARK OFFICE
CERTIFICATE OF CORRECTION

PATENT NO. : 5,703,569
DATED : December 30, 1997
INVENTOR(S) : J. Oliver et al.

It is certified that error appears in the above-identified patent and that said Letters Patent is hereby corrected as shown below:

Title Page, item[63], prior art, Related U.S. Data, replace "1984" with --1994--.

Title Page, item [*], add --Notice: The term of this patent shall not extend beyond the expiration date of Pat. Nos. 5,402,110 and 5,548,278.--

Column 1, line 5, replace "CIP" with -- C-I-P --.

Column 1, line 9, replace "replace "issues" with --issued--.

Column 3, line 40, replace "replace "If" with --if--.

Column 4, line 63, replace replace " . " with -- ; --.

Column 7, line 59, replace "provide" with --provided--.

Column 7, line 62, replace "1" next line "00" with --100--.

Column 9, line 2, replace "150°" with --160°--.

Column 9, line 20, replace "FIGS." with --FIG.--.

Column 9, line 23, replace "1 34" with --134--.

UNITED STATES PATENT AND TRADEMARK OFFICE
CERTIFICATE OF CORRECTION

PATENT NO. : 5,703,569
DATED : December 30, 1997
INVENTOR(S) : J. Oliver et al.

It is certified that error appears in the above-identified patent and that said Letters Patent is hereby corrected as shown below:

In The Claims

Column 17, line 12, claim 5, replace "discreet" with --discrete--.

Column 19, line 10, claim 32, replace "discreet" with --discrete--.

Column 19, line 56, claim 43, after tank add -- , --.

Column 20, line 10, claim 50, delete "," after system.

Column 22, line 11, claim 74, replace "discreet" with --discrete--.

Signed and Sealed this

Thirtieth Day of March, 1999

*Attest:*

Q. TODD DICKINSON

*Attesting Officer*  *Acting Commissioner of Patents and Trademarks*